(12) United States Patent
Lawlor et al.

(10) Patent No.: US 10,710,514 B2
(45) Date of Patent: *Jul. 14, 2020

(54) ACCESSORY MOUNTING SYSTEM FOR A VEHICLE

(71) Applicant: MAGNA ELECTRONICS INC., Auburn Hills, MI (US)

(72) Inventors: Patrick J. Lawlor, Dublin (IE); Patrick J. Dowling, County Kildare (IE); Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/059,544

(22) Filed: Aug. 9, 2018

(65) Prior Publication Data

US 2018/0361948 A1 Dec. 20, 2018

Related U.S. Application Data

(63) Continuation of application No. 14/809,538, filed on Jul. 27, 2015, now Pat. No. 10,046,714, which is a (Continued)

(30) Foreign Application Priority Data

Dec. 15, 2004 (IE) .................................. S2004/0840

(51) Int. Cl.
*B60R 11/04* (2006.01)
*B60R 1/00* (2006.01)
(Continued)

(52) U.S. Cl.
CPC ................ *B60R 11/04* (2013.01); *B60R 1/00* (2013.01); *B60R 1/12* (2013.01);
(Continued)

(58) Field of Classification Search
CPC .............. B60R 1/12; B60R 2001/1223; B60R 2001/1253; B60R 2001/1284; B60R 11/04; B60R 2011/0026; B60R 2011/0063
(Continued)

(56) References Cited

U.S. PATENT DOCUMENTS 1,472,509 A 6/1922 Bitter
2,414,223 A 1/1947 De Virgilis
(Continued)

FOREIGN PATENT DOCUMENTS

DE 3525672 1/1987
DE 3605704 8/1987
(Continued)

OTHER PUBLICATIONS

"Combination of rain sensing, autolamps and telephone antenna in one module," Research Disclosure, Kenneth Mason Publications, Hampshire, GB No. 412, Aug. 1998 (Aug. 1998), p. 1045XP-000824825.
(Continued)

*Primary Examiner* — Hilary L Gutman
(74) *Attorney, Agent, or Firm* — Honigman LLP

(57) ABSTRACT

A method for mounting an accessory at a vehicular windshield includes adhesively attaching a base portion of each of at least three fixing elements at an interior cabin side of the windshield in a spaced apart non-contiguous manner. A frame includes a plurality of individual receiving portions. With the windshield installed in the vehicle, the frame is attached at the fixing elements via receiving an elongated portion of a respective and corresponding one of the fixing elements in a respective and corresponding one of the receiving portions of the frame. With the windshield installed in the vehicle, and with the frame attached at the fixing elements, a camera is disposed at the frame and
(Continued)

received at structure of the frame, such that the camera views through the windshield via an aperture existing in the frame and a light transmissive aperture in a light absorbing layer of the windshield.

20 Claims, 7 Drawing Sheets

Related U.S. Application Data continuation of application No. 13/572,042, filed on Aug. 10, 2012, now Pat. No. 9,090,213, which is a continuation of application No. 11/721,406, filed as application No. PCT/EP2005/013485 on Dec. 14, 2005, now Pat. No. 8,256,821.

(51) Int. Cl.
*B60R 1/12* (2006.01)
*B60R 11/00* (2006.01)

(52) U.S. Cl.
CPC . *B60R 2001/123* (2013.01); *B60R 2001/1223* (2013.01); *B60R 2001/1253* (2013.01); *B60R 2001/1261* (2013.01); *B60R 2001/1284* (2013.01); *B60R 2011/0026* (2013.01); *B60R 2011/0063* (2013.01); *B60R 2300/10* (2013.01)

(58) Field of Classification Search
USPC .......................................... 296/1.11; 701/301
See application file for complete search history.

(56) References Cited

U.S. PATENT DOCUMENTS

| | | |
|---|---|---|
| 3,208,070 A | 9/1965 | Boicey |
| 3,367,616 A | 2/1968 | Bausch |
| 3,870,404 A | 3/1975 | Wilson et al. |
| 4,065,750 A | 12/1977 | Duncan et al. |
| 4,254,931 A | 3/1981 | Aikens et al. |
| 4,274,078 A | 6/1981 | Isobe et al. |
| 4,286,305 A | 8/1981 | Pilat et al. |
| 4,390,742 A | 6/1983 | Wideman |
| 4,443,057 A | 4/1984 | Bauer et al. |
| 4,645,975 A | 2/1987 | Meitzler et al. |
| 4,646,210 A | 2/1987 | Skogler et al. |
| 4,646,673 A | 3/1987 | Fordyce |
| 4,733,336 A | 3/1988 | Skogler et al. |
| 4,760,497 A | 7/1988 | Roston |
| 4,768,135 A | 8/1988 | Kretschmer et al. |
| 4,781,436 A | 11/1988 | Armbruster |
| 4,793,690 A | 12/1988 | Gahan et al. |
| 4,807,096 A | 2/1989 | Skogler et al. |
| 4,859,867 A | 8/1989 | Larson et al. |
| 4,863,130 A | 9/1989 | Marks, Jr. |
| 4,871,917 A | 10/1989 | O'Farrell et al. |
| 4,883,349 A | 11/1989 | Mittelhauser |
| 4,884,055 A | 11/1989 | Memmola |
| 4,886,960 A | 12/1989 | Molyneux et al. |
| 4,891,559 A | 1/1990 | Matsumoto et al. |
| 4,895,097 A | 1/1990 | Lechnir |
| 4,916,374 A | 4/1990 | Schierbeek et al. |
| 4,930,742 A | 6/1990 | Schofield et al. |
| 4,936,533 A | 6/1990 | Adams et al. |
| 4,948,242 A | 8/1990 | Desmond et al. |
| 4,956,591 A | 9/1990 | Schierbeek et al. |
| 4,967,319 A | 10/1990 | Seko |
| 4,973,844 A | 11/1990 | O'Farrell et al. |
| 5,058,851 A | 10/1991 | Lawlor et al. |
| 5,080,309 A | 1/1992 | Ivins |
| 5,096,287 A | 3/1992 | Kakinami et al. |
| 5,100,095 A | 3/1992 | Haan et al. |
| 5,111,289 A | 5/1992 | Lucas et al. |
| 5,140,455 A | 8/1992 | Varaprasad et al. |
| 5,151,816 A | 9/1992 | Varaprasad et al. |
| 5,160,780 A | 11/1992 | Ono et al. |
| 5,178,448 A | 1/1993 | Adams et al. |
| 5,193,029 A | 3/1993 | Schofield et al. |
| 5,255,442 A | 10/1993 | Schierbeek et al. |
| 5,264,997 A | 11/1993 | Hutchisson et al. |
| 5,266,873 A | 11/1993 | Arditi et al. |
| 5,327,288 A | 7/1994 | Wellington et al. |
| 5,330,149 A | 7/1994 | Haan et al. |
| D351,370 S | 10/1994 | Lawlor et al. |
| 5,361,190 A | 11/1994 | Roberts |
| 5,371,659 A | 12/1994 | Pastrick et al. |
| 5,377,948 A | 1/1995 | Suman et al. |
| 5,377,949 A | 1/1995 | Haan et al. |
| 5,406,414 A | 4/1995 | O'Farrell et al. |
| 5,426,294 A | 6/1995 | Kobayashi et al. |
| 5,439,305 A | 8/1995 | Santo |
| 5,448,180 A | 9/1995 | Kienzler et al. |
| 5,455,716 A | 10/1995 | Suman et al. |
| 5,469,298 A | 11/1995 | Suman et al. |
| 5,475,366 A | 12/1995 | Van Lente et al. |
| 5,487,522 A | 1/1996 | Hook |
| 5,488,352 A | 1/1996 | Jasper |
| 5,497,306 A | 3/1996 | Pastrick |
| 5,521,760 A | 5/1996 | De Young et al. |
| 5,530,240 A | 6/1996 | Larson et al. |
| 5,537,003 A | 7/1996 | Bechtel et al. |
| 5,550,677 A | 8/1996 | Schofield et al. |
| 5,558,123 A | 9/1996 | Castel et al. |
| 5,566,224 A | 10/1996 | Azam et al. |
| 5,567,896 A | 10/1996 | Gottschall |
| 5,570,127 A | 10/1996 | Schmidt |
| 5,572,354 A | 11/1996 | Desmond et al. |
| 5,576,687 A | 11/1996 | Blank et al. |
| 5,582,383 A | 12/1996 | Mertens et al. |
| 5,587,236 A | 12/1996 | Agrawal et al. |
| 5,588,123 A | 12/1996 | Loibl |
| 5,602,457 A | 2/1997 | Anderson et al. |
| 5,609,652 A | 3/1997 | Yamada et al. |
| 5,614,885 A | 3/1997 | Van Lente et al. |
| 5,615,857 A | 4/1997 | Hook |
| 5,631,638 A | 5/1997 | Kasper et al. |
| 5,632,551 A | 5/1997 | Roney et al. |
| 5,649,756 A | 7/1997 | Adams et al. |
| 5,654,686 A | 8/1997 | Geschke et al. |
| 5,659,423 A | 8/1997 | Schierbeek et al. |
| 5,660,454 A | 8/1997 | Mori et al. |
| 5,661,455 A | 8/1997 | Van Lente et al. |
| 5,666,157 A | 9/1997 | Aviv |
| 5,667,896 A | 9/1997 | Carter et al. |
| 5,669,698 A | 9/1997 | Veldman et al. |
| 5,669,705 A | 9/1997 | Pastrick et al. |
| 5,670,935 A | 9/1997 | Schofield et al. |
| 5,671,996 A | 9/1997 | Bos et al. |
| 5,689,241 A | 11/1997 | Clark, Sr. et al. |
| 5,691,848 A | 11/1997 | Van Lente et al. |
| D388,107 S | 12/1997 | Huckins |
| 5,703,568 A | 12/1997 | Hegyi |
| 5,708,410 A | 1/1998 | Blank et al. |
| 5,708,743 A | 1/1998 | DeAndrea et al. |
| 5,710,633 A | 1/1998 | Klappenbach et al. |
| 5,719,551 A | 2/1998 | Flick |
| 5,760,962 A | 6/1998 | Schofield et al. |
| 5,774,283 A | 6/1998 | Nagel et al. |
| 5,786,772 A | 7/1998 | Schofield et al. |
| 5,793,308 A | 8/1998 | Rosinski et al. |
| 5,796,094 A | 8/1998 | Schofield et al. |
| 5,796,176 A | 8/1998 | Kramer et al. |
| 5,798,575 A | 8/1998 | O'Farrell et al. |
| 5,804,719 A | 9/1998 | Didelot et al. |
| 5,820,097 A | 10/1998 | Spooner |
| 5,820,245 A | 10/1998 | Desmond et al. |
| 5,825,283 A | 10/1998 | Camhi |
| 5,837,891 A | 11/1998 | Bridge |
| 5,837,994 A | 11/1998 | Stam et al. |
| 5,845,000 A | 12/1998 | Breed et al. |
| 5,863,116 A | 1/1999 | Pastrick et al. |
| 5,877,897 A | 3/1999 | Schofield et al. |
| 5,878,353 A | 3/1999 | ul Azam et al. |

(56) References Cited

U.S. PATENT DOCUMENTS

| | | |
|---|---|---|
| 5,883,193 A | 3/1999 | Karim |
| 5,910,854 A | 6/1999 | Varaprasad et al. |
| 5,920,061 A | 7/1999 | Feng |
| 5,923,027 A | 7/1999 | Stam et al. |
| 5,926,087 A | 7/1999 | Busch et al. |
| 5,940,503 A | 8/1999 | Palett et al. |
| 5,947,586 A | 9/1999 | Weber |
| 5,959,366 A | 9/1999 | Menke |
| 5,959,367 A | 9/1999 | O'Farrell et al. |
| 5,971,552 A | 10/1999 | O'Farrell et al. |
| 5,982,288 A | 11/1999 | Samatari et al. |
| 5,990,469 A | 11/1999 | Bechtel et al. |
| 6,000,823 A | 12/1999 | Desmond et al. |
| 6,006,159 A | 12/1999 | Schmier et al. |
| 6,020,704 A | 2/2000 | Buschur |
| 6,028,537 A | 2/2000 | Suman et al. |
| 6,049,171 A | 4/2000 | Stem et al. |
| 6,056,410 A | 5/2000 | Hoekstra et al. |
| 6,066,933 A | 5/2000 | Ponziana |
| 6,087,942 A | 7/2000 | Sleichter, III et al. |
| 6,087,953 A | 7/2000 | DeLine et al. |
| 6,089,721 A | 7/2000 | Schierbeek |
| 6,097,023 A | 8/2000 | Schofield |
| 6,097,024 A | 8/2000 | Stam et al. |
| 6,100,798 A | 8/2000 | Liang |
| 6,108,084 A | 8/2000 | Winner |
| 6,124,647 A | 9/2000 | Marcus et al. |
| 6,124,886 A | 9/2000 | DeLine et al. |
| 6,151,065 A | 11/2000 | Steed et al. |
| 6,158,655 A | 12/2000 | DeVries, Jr. et al. |
| 6,166,625 A | 12/2000 | Teowee et al. |
| 6,166,698 A | 12/2000 | Turnbull et al. |
| 6,170,955 B1 | 1/2001 | Campbell et al. |
| 6,172,613 B1 | 1/2001 | DeLine et al. |
| 6,176,602 B1 | 1/2001 | Pastrick et al. |
| 6,198,087 B1 | 3/2001 | Boon |
| 6,198,409 B1 | 3/2001 | Schofield et al. |
| 6,201,642 B1 | 3/2001 | Bos |
| 6,207,967 B1 | 3/2001 | Hochstein |
| 6,210,008 B1 | 4/2001 | Hoekstra et al. |
| 6,218,934 B1 | 4/2001 | Regan |
| 6,222,460 B1 | 4/2001 | DeLine et al. |
| 6,229,226 B1 | 5/2001 | Kramer et al. |
| 6,229,434 B1 | 5/2001 | Knapp et al. |
| 6,243,003 B1 | 6/2001 | DeLine et al. |
| 6,250,148 B1 | 6/2001 | Lynam |
| 6,259,359 B1 | 7/2001 | Fujinami et al. |
| 6,276,821 B1 | 8/2001 | Pastrick et al. |
| 6,278,377 B1 | 8/2001 | DeLine et al. |
| 6,291,905 B1 | 9/2001 | Drummond et al. |
| 6,294,989 B1 | 9/2001 | Schofield et al. |
| 6,296,379 B1 | 10/2001 | Pastrick |
| 6,299,316 B1 | 10/2001 | Fletcher et al. |
| 6,299,319 B1 | 10/2001 | Mertens et al. |
| 6,302,545 B1 | 10/2001 | Schofield et al. |
| 6,305,807 B1 | 10/2001 | Schierbeek |
| 6,313,454 B1 | 11/2001 | Bos et al. |
| 6,318,697 B1 | 11/2001 | Corrado et al. |
| 6,320,176 B1 | 11/2001 | Schofield et al. |
| 6,323,477 B1 | 11/2001 | Biasing et al. |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,013 B1 | 1/2002 | Battiti et al. |
| 6,341,523 B2 | 1/2002 | Lynam |
| 6,353,392 B1 | 3/2002 | Schofield et al. |
| 6,366,213 B2 | 4/2002 | DeLine et al. |
| 6,386,742 B1 | 5/2002 | DeLine et al. |
| 6,389,340 B1 | 5/2002 | Rayner |
| 6,392,218 B1 | 5/2002 | Kuehnle |
| 6,396,397 B1 | 5/2002 | Bos et al. |
| 6,406,152 B1 | 6/2002 | Hoekstra et al. |
| 6,412,973 B1 | 7/2002 | Bos et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,452,148 B1 | 9/2002 | Bendicks et al. |
| 6,466,136 B2 | 10/2002 | DeLine et al. |
| 6,477,464 B2 | 11/2002 | McCarthy et al. |
| 6,483,438 B2 | 11/2002 | DeLine et al. |
| 6,496,117 B2 | 12/2002 | Gutta et al. |
| 6,498,620 B2 | 12/2002 | Schofield et al. |
| 6,498,967 B1 | 12/2002 | Hopkins et al. |
| 6,501,387 B2 | 12/2002 | Skiver et al. |
| 6,509,832 B1 | 1/2003 | Bauer et al. |
| 6,513,252 B1 | 2/2003 | Schierbeek et al. |
| 6,515,378 B2 | 2/2003 | Drummond et al. |
| 6,516,664 B2 | 2/2003 | Lynam |
| 6,523,964 B2 | 2/2003 | Larson et al. |
| 6,535,242 B1 | 3/2003 | Strumolo et al. |
| 6,545,598 B1 | 4/2003 | De Villeroche |
| 6,555,804 B1 | 4/2003 | Biasing |
| 6,564,122 B1 | 5/2003 | Huertgen et al. |
| 6,587,573 B1 | 7/2003 | Stam et al. |
| 6,587,968 B1 | 7/2003 | Leyva |
| 6,593,565 B2 | 7/2003 | Heslin et al. |
| 6,593,960 B1 | 7/2003 | Sugimoto et al. |
| 6,596,978 B2 | 7/2003 | Hochstein |
| 6,603,137 B2 | 8/2003 | Hochstein |
| 6,614,043 B2 | 9/2003 | Hochstein |
| 6,614,579 B2 | 9/2003 | Roberts et al. |
| 6,615,650 B2 | 9/2003 | Mahner et al. |
| 6,617,564 B2 | 9/2003 | Ockerse et al. |
| 6,646,359 B2 | 11/2003 | Schaefer et al. |
| 6,648,477 B2 | 11/2003 | Hutzel et al. |
| 6,653,615 B2 | 11/2003 | Bechtel et al. |
| 6,660,360 B2 | 12/2003 | Mertzel et al. |
| 6,672,744 B2 | 1/2004 | DeLine et al. |
| 6,672,745 B1 | 1/2004 | Bauer et al. |
| 6,681,163 B2 | 1/2004 | Stam et al. |
| 6,690,268 B2 | 2/2004 | Schofield et al. |
| 6,731,071 B2 | 5/2004 | Baarman |
| 6,734,904 B1 | 5/2004 | Boon et al. |
| 6,737,963 B2 | 5/2004 | Gutta et al. |
| 6,738,088 B1 | 5/2004 | Uskolovsky et al. |
| 6,742,904 B2 | 6/2004 | Bechtel et al. |
| 6,742,905 B2 | 6/2004 | Suyama et al. |
| 6,765,480 B2 | 7/2004 | Tseng |
| 6,768,092 B2 | 7/2004 | Sakata |
| 6,774,356 B2 | 8/2004 | Heslin et al. |
| 6,774,810 B2 | 8/2004 | DeLine et al. |
| 6,784,129 B2 | 8/2004 | Seto et al. |
| 6,799,904 B2 | 10/2004 | Schaefer et al. |
| 6,803,574 B2 | 10/2004 | Abel et al. |
| 6,806,485 B2 | 10/2004 | Jackson, Jr. |
| 6,811,330 B1 | 11/2004 | Tozawa |
| 6,812,645 B2 | 11/2004 | Baarman |
| 6,824,281 B2 | 11/2004 | Schofield et al. |
| 6,825,620 B2 | 11/2004 | Kuennen et al. |
| 6,831,268 B2 | 12/2004 | Bechtel et al. |
| 6,831,288 B1 | 12/2004 | Schmitt et al. |
| 6,832,719 B2 | 12/2004 | DeVries et al. |
| 6,841,767 B2 | 1/2005 | Mindl et al. |
| 6,867,510 B2 | 3/2005 | Kramer et al. |
| 6,877,870 B2 | 4/2005 | Krug |
| 6,877,888 B2 | 4/2005 | DeLine et al. |
| 6,889,064 B2 | 5/2005 | Baratono et al. |
| 6,894,619 B1 | 5/2005 | Schmitt et al. |
| 6,917,163 B2 | 7/2005 | Baarman |
| 6,924,470 B2 | 8/2005 | Bechtel et al. |
| 6,930,593 B2 | 8/2005 | Crawshaw |
| 6,968,736 B2 | 11/2005 | Lynam |
| 6,975,215 B2 | 12/2005 | Schofield et al. |
| 6,975,390 B2 | 12/2005 | Mindl et al. |
| 6,980,092 B2 | 12/2005 | Turnbull et al. |
| 6,995,354 B2 | 2/2006 | Hagan et al. |
| 7,004,593 B2 | 2/2006 | Weller et al. |
| 7,016,783 B2 | 3/2006 | Hac et al. |
| 7,027,387 B2 | 4/2006 | Reinold et al. |
| 7,041,965 B2 | 5/2006 | Heslin et al. |
| 7,053,761 B2 | 5/2006 | Schofield et al. |
| 7,075,511 B1 | 7/2006 | Mousseau et al. |
| 7,108,409 B2 | 9/2006 | DeLine et al. |

(56) References Cited

U.S. PATENT DOCUMENTS

| | | |
|---|---|---|
| 7,111,996 B2 | 9/2006 | Seger et al. |
| 7,188,963 B2 | 3/2007 | Schofield et al. |
| 7,195,381 B2 | 3/2007 | Lynam et al. |
| 7,199,767 B2 | 4/2007 | Spero |
| 7,205,524 B2 | 4/2007 | Drummond et al. |
| 7,242,320 B2 | 7/2007 | Lawlor et al. |
| 7,249,860 B2 | 7/2007 | Kulas et al. |
| 7,255,451 B2 | 8/2007 | McCabe et al. |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,289,037 B2 | 10/2007 | Uken et al. |
| 7,297,932 B2 | 11/2007 | Georgiadis et al. |
| 7,304,680 B2 | 12/2007 | Köhler et al. |
| 7,311,428 B2 | 12/2007 | DeLine et al. |
| 7,322,755 B2 | 1/2008 | Neumann et al. |
| 7,370,983 B2 | 5/2008 | DeWind et al. |
| 7,420,159 B2 | 9/2008 | Heslin et al. |
| 7,438,774 B2 | 10/2008 | Kurfiss et al. |
| 7,446,427 B2 | 11/2008 | Parker et al. |
| 7,460,007 B2 | 12/2008 | Schofield et al. |
| 7,467,883 B2 | 12/2008 | DeLine et al. |
| 7,480,149 B2 | 1/2009 | DeWard et al. |
| 7,490,944 B2 | 2/2009 | Blank et al. |
| 7,497,632 B2 | 3/2009 | Kajino et al. |
| 7,533,998 B2 | 5/2009 | Schofield et al. |
| 7,538,316 B2 | 5/2009 | Heslin et al. |
| 7,570,793 B2 | 8/2009 | Lages et al. |
| 7,609,961 B2 | 10/2009 | Park |
| 7,646,889 B2 | 1/2010 | Tsukamoto |
| 7,651,228 B2 | 1/2010 | Skiver et al. |
| 7,657,052 B2 | 2/2010 | Larson et al. |
| 7,658,521 B2 | 2/2010 | DeLine et al. |
| 7,697,028 B1 | 4/2010 | Johnson |
| 7,719,408 B2 | 5/2010 | DeWard et al. |
| 7,728,721 B2 | 6/2010 | Schofield et al. |
| 7,780,137 B2 | 8/2010 | Hansel et al. |
| 7,780,454 B2 | 8/2010 | Baranski |
| 7,811,011 B2 | 10/2010 | Blaesing et al. |
| 7,817,205 B2 | 10/2010 | Schulte et al. |
| 7,837,173 B2 | 11/2010 | Zinzer et al. |
| 7,855,353 B2 | 12/2010 | Blaesing et al. |
| 7,855,755 B2 | 12/2010 | Weller et al. |
| 7,860,275 B2 | 12/2010 | Leleve et al. |
| 7,864,981 B2 | 1/2011 | Leleve et al. |
| 7,888,629 B2 | 2/2011 | Heslin et al. |
| 7,889,086 B2 | 2/2011 | Schafer et al. |
| 7,911,356 B2 | 3/2011 | Wohlfahrt et al. |
| 7,914,188 B2 | 3/2011 | DeLine et al. |
| 7,916,009 B2 | 3/2011 | Schofield et al. |
| 7,940,305 B2 | 5/2011 | Adameck |
| 7,965,336 B2 | 6/2011 | Bingle et al. |
| 7,994,471 B2 | 8/2011 | Heslin et al. |
| 8,051,707 B2 | 11/2011 | Roehr et al. |
| 8,094,002 B2 | 1/2012 | Schofield et al. |
| 8,100,568 B2 | 1/2012 | DeLine et al. |
| 8,134,117 B2 | 3/2012 | Heslin et al. |
| 8,179,437 B2 | 5/2012 | Schofield et al. |
| 8,192,095 B2 | 6/2012 | Kortan et al. |
| 8,256,821 B2 | 9/2012 | Lawlor et al. |
| 8,288,711 B2 | 10/2012 | Heslin et al. |
| 8,309,907 B2 | 11/2012 | Heslin et al. |
| 8,339,453 B2 | 12/2012 | Blake, III et al. |
| 8,481,916 B2 | 7/2013 | Heslin et al. |
| 8,508,593 B1 | 8/2013 | Schofield et al. |
| 8,513,590 B2 | 8/2013 | Heslin et al. |
| 8,531,278 B2 | 9/2013 | DeWard et al. |
| 8,531,279 B2 | 9/2013 | DeLine et al. |
| 8,534,887 B2 | 9/2013 | DeLine et al. |
| 8,692,659 B2 | 4/2014 | Schofield et al. |
| 8,710,969 B2 | 4/2014 | DeWard et al. |
| 8,749,367 B2 | 6/2014 | Schofield et al. |
| 9,035,233 B2 | 5/2015 | Lynam et al. |
| 9,090,213 B2 | 7/2015 | Lawlor et al. |
| 9,193,308 B2 * | 11/2015 | Okuda .................... B60R 11/04 |
| 10,046,714 B2 | 8/2018 | Lawlor et al. |
| 10,434,954 B2 * | 10/2019 | Hart ........................ B60R 11/04 |
| 2002/0003571 A1 | 1/2002 | Schofield et al. |
| 2002/0075387 A1 | 6/2002 | Janssen |
| 2002/0126457 A1 | 9/2002 | Kameyama |
| 2003/0070741 A1 | 4/2003 | Rosenberg et al. |
| 2003/0169522 A1 | 9/2003 | Schofield et al. |
| 2004/0200948 A1 | 10/2004 | Bos et al. |
| 2004/0232773 A1 | 11/2004 | Parker et al. |
| 2005/0237385 A1 | 10/2005 | Kosaka et al. |
| 2006/0050018 A1 | 3/2006 | Hutzel et al. |
| 2006/0061008 A1 | 3/2006 | Karner et al. |
| 2007/0132610 A1 | 6/2007 | Guernalec et al. |
| 2007/0235638 A1 | 10/2007 | Backes et al. |
| 2008/0092673 A1 | 4/2008 | Hansel et al. |
| 2010/0208077 A1 | 8/2010 | DeWard et al. |
| 2011/0025850 A1 | 2/2011 | Maekawa et al. |
| 2011/0155874 A1 | 6/2011 | Roehr et al. |
| 2012/0224065 A1 | 9/2012 | Schofield et al. |
| 2012/0310519 A1 | 12/2012 | Lawlor et al. |
| 2014/0015976 A1 | 1/2014 | DeLine et al. |
| 2015/0116799 A1 | 4/2015 | Someno |
| 2016/0023620 A1 * | 1/2016 | Matori .................... B60R 11/04 348/148 |
| 2016/0039358 A1 * | 2/2016 | Okuda ................... B60W 30/09 348/148 |
| 2018/0239223 A1 * | 8/2018 | Blake, III .............. G03B 17/55 |
| 2018/0284398 A1 * | 10/2018 | Furutake .............. H04N 5/2252 |
| 2019/0315289 A1 * | 10/2019 | Okuda .................... B60R 11/04 |

FOREIGN PATENT DOCUMENTS

| | | | | |
|---|---|---|---|---|
| DE | 3937576 | 11/1989 | | |
| DE | 9306989.8 | 7/1993 | | |
| DE | 4214223 | 11/1993 | | |
| DE | 4329983 | 3/1995 | | |
| DE | 29513369 | 12/1995 | | |
| DE | 19647200 | 1/1998 | | |
| DE | 29805142 | 6/1998 | | |
| DE | 19755008 | 7/1999 | | |
| DE | 10132982 | 1/2003 | | |
| DE | 10211444 | 10/2003 | | |
| DE | 10237554 | 3/2004 | | |
| DE | 10237607 | 3/2004 | | |
| DE | 10342837 | 4/2005 | | |
| DE | 102005002686 | 8/2006 | | |
| DE | 102005015973 | 10/2006 | | |
| DE | 102006039065 | 3/2007 | | |
| DE | 19530617 | 2/2009 | | |
| DE | 102012201867 A1 * | 8/2012 | ............. B60R 11/04 | |
| EP | 0169734 | 10/1989 | | |
| EP | 0461424 | 12/1991 | | |
| EP | 0602962 | 6/1994 | | |
| EP | 0667254 | 8/1995 | | |
| EP | 0756968 | 2/1997 | | |
| EP | 0677428 | 6/1998 | | |
| EP | 0899157 | 3/1999 | | |
| EP | 0928723 | 7/1999 | | |
| EP | 0969275 | 1/2000 | | |
| EP | 0860325 | 11/2002 | | |
| EP | 1376051 | 1/2004 | | |
| EP | 1389565 | 2/2004 | | |
| EP | 2965949 A1 * | 1/2016 | ............. B60R 11/00 | |
| EP | 3330131 A1 * | 6/2018 | ............. B60R 11/04 | |
| EP | 3498537 A1 * | 6/2019 | ............. B60R 11/04 | |
| FR | 3074103 A1 * | 5/2019 | ............. B60R 11/04 | |
| GB | 1008411 | 10/1965 | | |
| GB | 1178416 | 1/1970 | | |
| GB | 1197710 | 7/1970 | | |
| GB | 2210835 | 6/1989 | | |
| GB | 2316379 | 2/1998 | | |
| IE | 970014 | 7/1998 | | |
| JP | 59029539 | 2/1984 | | |
| JP | 62043543 | 2/1987 | | |
| JP | S62131837 | 6/1987 | | |
| JP | 63258236 | 10/1988 | | |
| JP | 63258237 | 10/1988 | | |
| JP | 11069211 | 3/1999 | | |
| JP | H1178717 | 3/1999 | | |

(56) References Cited

FOREIGN PATENT DOCUMENTS

| | | |
|---|---|---|
| JP | H1178737 | 3/1999 |
| JP | 11131880 | 5/1999 |
| JP | 11254925 | 9/1999 |
| WO | WO199525651 | 9/1995 |
| WO | WO1996018275 | 6/1996 |
| WO | WO1997001246 | 1/1997 |
| WO | WO1997048134 | 12/1997 |
| WO | WO1998014974 | 4/1998 |
| WO | WO1999014088 | 3/1999 |
| WO | WO1999023828 | 5/1999 |
| WO | WO1999043242 | 9/1999 |
| WO | WO2000015462 | 3/2000 |
| WO | WO2001064481 | 9/2001 |
| WO | WO2001077763 | 10/2001 |
| WO | WO2001026332 | 12/2001 |
| WO | WO2002071487 | 9/2002 |
| WO | WO2003065084 | 8/2003 |

OTHER PUBLICATIONS

"Bus". 696-1983 IEEE Standard 696 Interface Devices, http://ieeexplore.ieee.org/xpl/abstractStandardDictionary.jsp?&arnumber=579126, accessed Aug. 7, 2014.

Batavia, et al., "Overtaking vehicle detection using implicit optical flow", Proceedings of the IEEE Transportation Systems Conference, Nov. 1997, pp. 729-734.

CAN Specification, Version 2.0, Bosch, 1991.

Devlin, William A., The Eyellipse and Considerations in the Driver's Forward Field of View, SAE 680105, Society of Automotive Engineers, Inc., Automotive Engineering Congress, Detroit, Michigan, (Jan. 8-12, 1968).

Goldbeck, J. et al., *Lane detection and tracking by video sensors*, Intelligent Transportation Systems, 1999. Proc., Oct. 5-8, 1999, pp. 74-49.

Jochem, Todd et al., Life in the Fast Lane, AI Magazine, vol. 17, No. 2, pp. 11-50, Summer 1996.

Lisowski, L., "*Specifications of a small electric vehicle: modular and distributed approach*", Intelligent Robots and Systems, 1997, IROS '97, Proceedings of the 1997 IEEE/RSJ International Conference on, vol. 2, Sep. 7-11, 1997.

Maurer, et al., "VaMoRs-P: an advanced platform for visual autonomous road vehicle guidance", 1995.

Media highlight reel for the National Automated Highway System Consortium's Demo '97, found at https://www.youtube.com/watch?v=6sDmA-sK3aE&list=PL80069F102808FBA3&index=6.

Motorola, Inc., MVME162 Embedded Controller Installation Guide (MVME162IG/D2), Aug. 1994.

N.R. Lynam and A. Agrawal, "Automotive Applications of Chromogenic Materials," from *Large Area Chromoqenics: Materials and Devices for Transmittance Control*, C.M. Lampert and C.G. Granquist, EDS, Optical Engineering Press, Washington (1990).

N.R. Lynam, "Electrochromic Automotive Day/Night Mirror," *SAE Technical Paper Series*, 870636 (1987).

N.R. Lynam, "Smart Windows for Automobiles," *SAE Technical Paper Series*, 900419 (1990).

Parent et al., Automatic Driving for Small Public Urban Vehicles, Intelligent Vehicle Symposium, Tokyo, Jul. 14-16, 1993.

Parker, McGraw-Hill Dictionary of Scientific and Technical Terms, Fifth Ed., 1994.

Philips Components, PCA82C200 Stand-alone CAN-controller, Oct. 1990.

Pomerleau, et al., "Rapidly Adapting Machine Vision for Automated Vehicle Steering", Apr. 30, 1996, pp. 19-27.

Rayner et al., "I-Witness Black Box Recorder", Intelligent Transportation Systems Program, Final Report for ITS-IDEA Project 84, published Nov. 2001.

SAE Technical Paper 2001-01-0072-LIN.

Sony Operating Manual CCD Color Video Camera Model: DXC-151A, 1993.

Thorpe, et al., "The 1997 Automated Highway Free Agent Demonstration", 1997 pp. 496-501.6049.

Thorpe, et al, "Toward autonomous driving: the CMU Navlab. I. Perception", IEEE Paper 1991.

\* cited by examiner

ACCESSORY MOUNTING SYSTEM FOR A VEHICLE

CROSS REFERENCE TO RELATED APPLICATIONS

The present application is a continuation of U.S. patent application Ser. No. 14/809,538, filed Jul. 27, 2015, now U.S. patent Ser. No. 10,046,714, which is a continuation of U.S. patent application Ser. No. 13/572,042, filed Aug. 10, 2012, now U.S. Pat. No. 9,090,213, which is a continuation of U.S. patent application Ser. No. 11/721,406, filed Jul. 31, 2009, now U.S. Pat. No. 8,256,821, which is a 371 national phase filing of PCT Application No. PCT/EP05/13485, filed Dec. 14, 2005, which claims the filing benefit of Irish Application No. S2004/0840, filed Dec. 15, 2004.

FIELD OF THE INVENTION

The present invention is concerned with an accessory module system for a vehicle window, in particular for housing a plurality of electronic accessories which can communicate with and/or through a windscreen of the vehicle. The system may also house accessories associated with, for example, the environmental control of the vehicle cabin, the communication of information to the driver/passenger by means of a digital display or the like, or a communications system such as a hands free phone. The system is also preferably adapted for the modular location of accessories therein, in order to allow variations in specification or luxury level.

BACKGROUND OF THE INVENTION

Certain accessories of a vehicle, such as a rain sensor assembly or imaging sensor assembly, typically are mounted tight against an interior surface of a windshield or window. This is required in some cases to maintain a desired distance between a light emitter/light sensor and the interior surface of the windshield, and/or to optically or thermally couple the component to the windshield, and/or to substantially seal the component at the windshield to prevent dust, dirt, smoke or other contaminants from affecting the component. However, as a result of this requirement, the accessory module assembly must be sufficiently rigid to apply and maintain a suitable force to the various components in order to maintain the components or accessories in intimate contact with the windscreen. As a result, the module assembly has little or no resilience, and is thus not generally capable of slight deformations to closely follow the contour of the windscreen.

It is also desired to provide a blacked out area or ceramic frit region in areas where such accessories are mounted at the windshield, in order to enhance the appearance of the vehicle. Therefore, an aperture or port may have to be formed in the frit layer for the camera or image sensor to be aligned with. However, the frit layer then may include the port or aperture even for vehicles where the camera-based or other accessory is not selected as an option. In order to provide an appropriate frit layer for the camera-based accessory option, the vehicle manufacturer may need to plan or design different frit layers for different options available to the vehicle, which may result in a proliferation of windshields and part numbers for the different optional accessories.

SUMMARY OF THE INVENTION

The present invention is intended to provide an accessory module assembly which overcomes the shortcomings of the prior art assemblies.

The present invention therefore provides, according to a first aspect, an accessory module system for a vehicle window comprising; an accessory module assembly comprising a frame assembly defining a plurality of sites for the modular location of accessories within the frame assembly; the accessory module assembly further comprising a cover assembly detachably connectable to the frame assembly.

Preferably, the cover assembly is resiliently mounted to the frame assembly such that the cover assembly is urged, in use, against the vehicle window.

According to a second aspect of the invention there is provided an accessory module system for a vehicle window comprising; an accessory module assembly comprising a substantially rigid frame assembly for the connection of one or more accessories thereto; the accessory module assembly further comprising a resiliently deformable cover assembly detachably connectable to the frame assembly such that the cover assembly is capable of deforming to conform to the shape of the vehicle window.

Preferably, the frame assembly defines a plurality of sites for the modular location of the accessories within the frame assembly.

Preferably, at least one of the sites comprises a connector assembly configured to provide the simultaneous mechanical and electrical connection of a corresponding accessory to the accessory module assembly.

Preferably, the system comprises an electrical terminal having a single power and/or control input and a plurality of power and/or control outputs.

Preferably, at least one of the sites comprises a cradle for receiving and supporting one of the accessories therein.

Preferably, the system comprises a mirror assembly detachably connectable to the accessory module assembly.

Preferably, the mirror assembly is in electrical communication with the accessory module assembly.

Preferably, the cover assembly comprises at least one aperture to enable a corresponding accessory to communicate with and/or through the vehicle window.

Preferably, the system comprises an attachment member for affixing to the vehicle window, the frame assembly comprising a corresponding mounting portion configured for releasable engagement with and/or about the attachment member.

Preferably, the attachment member comprises two or more discrete fixing elements.

Preferably, the system comprises a vehicle window comprising a frit having at least one aperture corresponding substantially in shape and orientation to the at least one aperture in the cover assembly.

Preferably, the system comprises ventilation means to facilitate cooling of the accessory module assembly.

Preferably, the ventilation means comprises a plurality of ventilation openings in the accessory module assembly.

Preferably, the cover assembly comprises a material having a heat deflection temperature of at least 75° C., preferably at least 85° C., and most preferably at least 105° C.

Preferably, the system comprises a plurality of accessories.

Preferably, the accessories comprise one or more of a closing velocity sensor assembly, a rain sensor assembly, a window temperature sensor assembly, a camera assembly, a compass assembly, a communications assembly, a light sensor assembly, a humidity sensor assembly, and a display assembly.

Preferably, the closing velocity sensor assembly comprises a LIDAR sensor assembly.

Preferably, at least one of the sites comprises means for adjusting the position of an accessory locatable within the site.

As used herein, the term "site" is intended to mean a location or area which is adapted, whether by having a complementary shape or otherwise, to receive an accessory or component therein or thereabout.

As used herein, the term "communications assembly" is intended to mean any assembly or accessory which is capable of either communicating information to the driver/passenger, or which allows the driver/passenger to communicate information to one or more of the vehicles systems or to an outside source using for example telephony.

BRIEF DESCRIPTION OF THE DRAWINGS

The present invention will now be described with reference to the accompanying drawings, in which.

DESCRIPTION OF THE PREFERRED EMBODIMENTS

Figure 1:
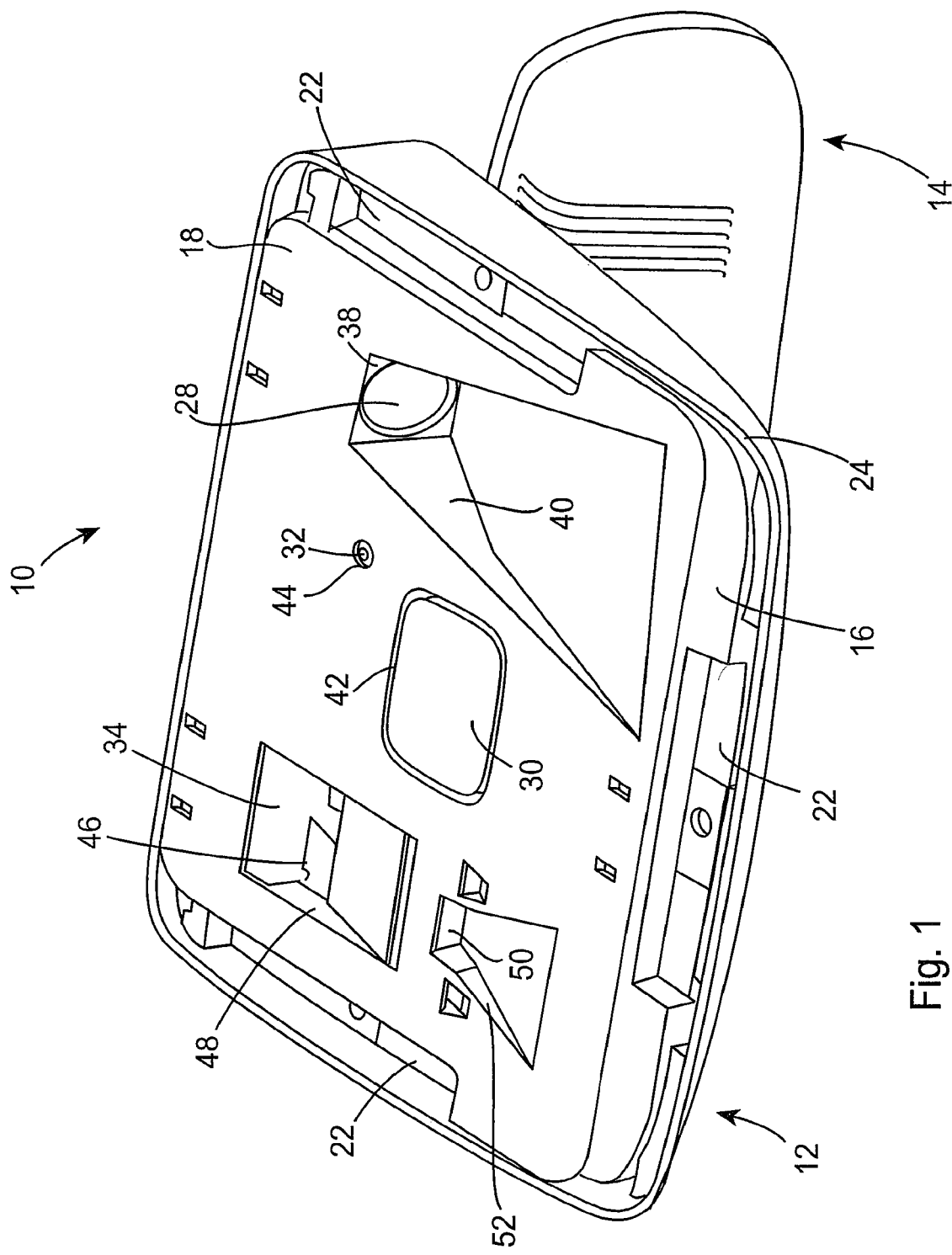
FIG. 1 illustrates a perspective view of an accessory module assembly and a mirror assembly forming part of an accessory module system according to the present invention.
Figure 2:
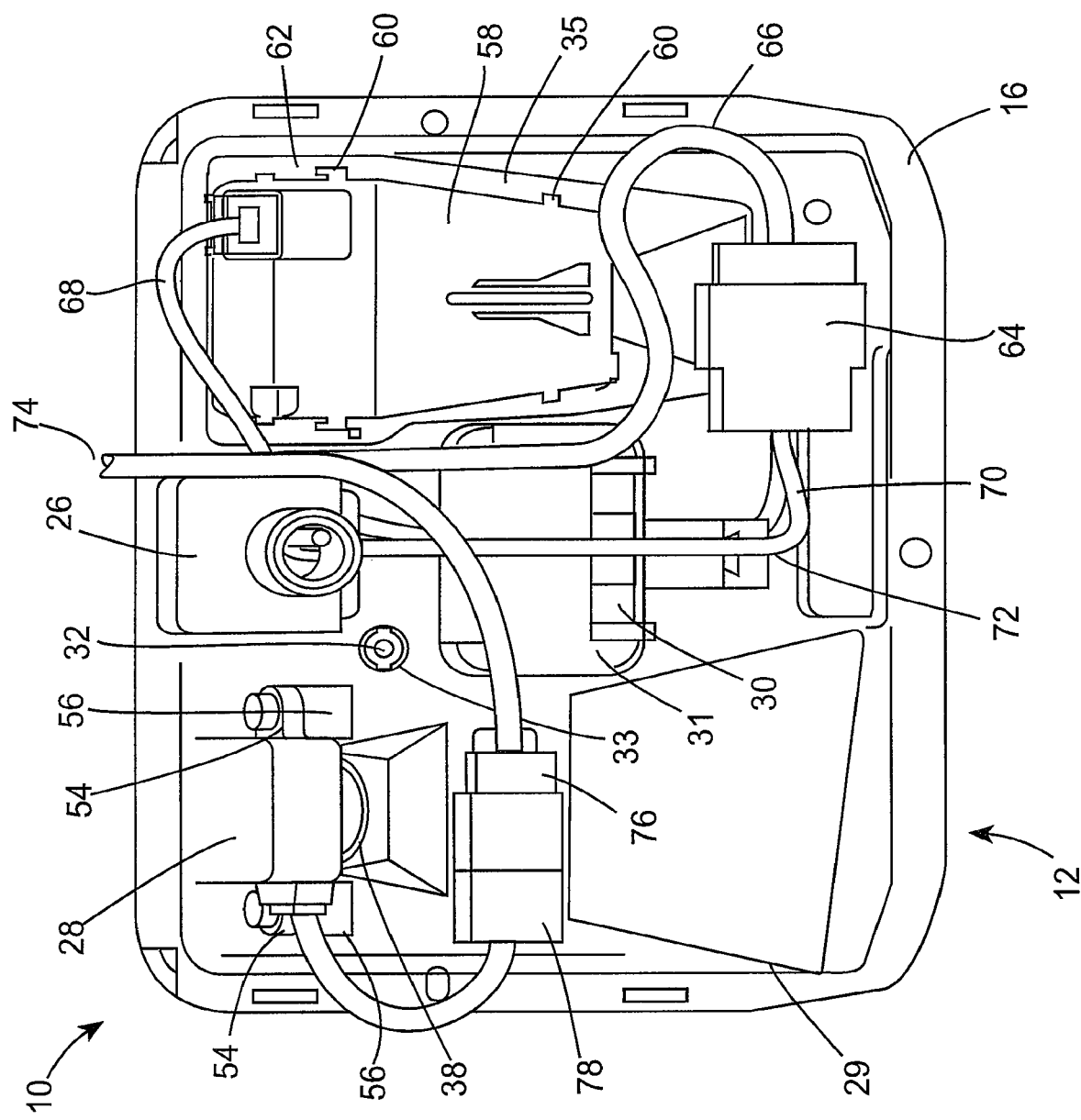
FIG. 2 illustrates a perspective view from the reverse side of FIG. 1, in which an outer casing of the accessory module assembly has been removed to reveal the internal accessories thereof.
Figure 3:
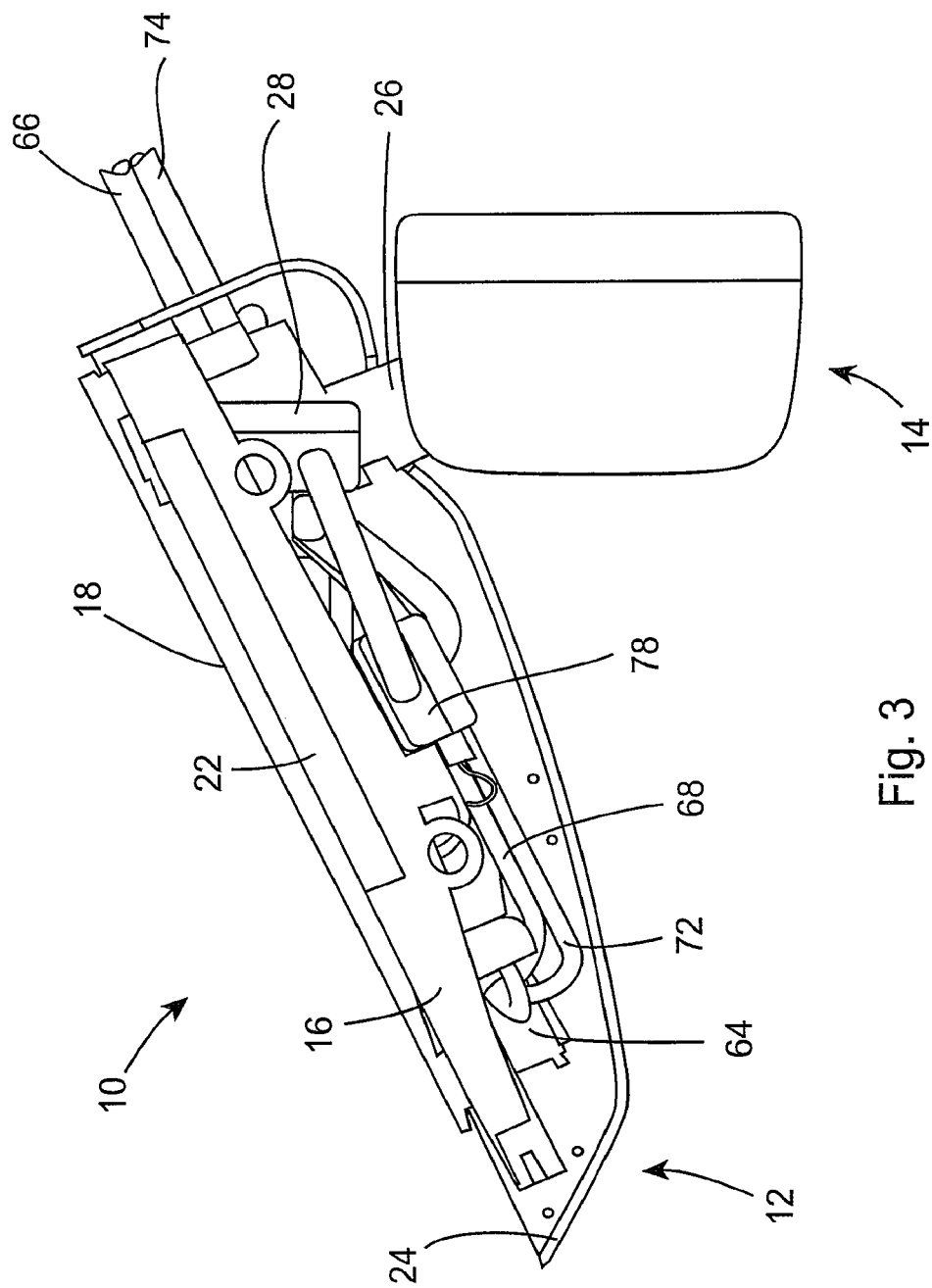
FIG. 3 illustrates a sectioned side view of the accessory module assembly and mirror module assembly illustrated in FIG. 1.

Referring now to the accompanying drawings there is illustrated an accessory module system, generally indicated as 10, for mounting against a vehicle window (not shown) in particular a windscreen of a vehicle, as will be described in more detail hereinafter. The system 10 comprises an accessory module assembly 12 and, in the preferred embodiment illustrated, a mirror assembly 14 detachably connected to the module assembly 12 in substantially conventional fashion. It will however be appreciated from the following description that the mirror assembly 14 does not form an essential element of the invention, and the system 10 could be provided without the mirror assembly 14. The module assembly 12 could be designed to be seated against or partially surrounding an existing mirror assembly mounted directly to the vehicle windscreen. When included, the mirror assembly 14 may be of any conventional form, and preferably has a front opening (not shown) which is normally closed by a reflective element (also not shown). The reflective element may comprise an electro-optic cell (such as an electrochromic mirror element) so that the reflectivity of the mirror assembly 14 can be electrically varied according to prevailing conditions. The construction and operation of the mirror assembly 14 is well known to those skilled in the art, and no further details are therefore deemed necessary.

The accessory module assembly 12 comprises a frame assembly 16 containing, as will be described in detail hereinafter, a plurality of accessories in the form of electronic components for taking various measurements/readings and/or for controlling various functions of the vehicle to which the system 10 is fitted. The accessory module assembly 12 further comprises a cover assembly 18 detachably connected to the frame assembly 16, and located in use between the frame assembly 16 and the windscreen (not shown) of the vehicle. The cover assembly 18 performs a number of functions, primarily to shield from view the various components or accessories contained within the accessory module assembly 12, when viewed from an exterior of the vehicle. In addition, the cover assembly 18 closely conforms to the shape of the windscreen in order to provide an aesthetically pleasing fit between the accessory module assembly 12 and the windscreen, while also substantially preventing the ingress of contaminants between the windscreen and the cover assembly 18, which might otherwise adversely affect the operation of one or more of the accessories which communication with and/or through the windscreen. These functions, and others, will be described in greater detail hereinafter.

The accessory module assembly 12 may be mounted against the windscreen by any suitable means, for example using an adhesive or the like. However, in the preferred embodiment illustrated, the system 10 comprises an attachment member comprising three discrete fixing elements in the form of rails 20 which in use are mounted to the vehicle windscreen by an adhesive or the like. There could of course be more or less rails 20 if desired or required. The frame assembly 16 comprises a mounting portion in the form of three correspondingly positioned recesses 22 for receiving the rails 20, the frame assembly 16 and rails 20 preferably having co-operating retention means (not shown) such as clips or the like, in order to secure the frame assembly 16 to the rails 20, and therefore the vehicle windscreen. Alternatively a screw (not shown) or similar fastener element may be passed through the frame assembly 16 and into the respective rail 20. In order to simplify the process of fitting the rails 20 to the windscreen, and to eliminate the possibility of inaccurate spacing between each of the three rails 20, the rails 20 are preferably initially located within a frame or jig (not shown) which accurately positions the rails 20 with respect to one another. The frame or jig can then be positioned against the windscreen in order to simultaneously position each of the rails 20, at the correct positions, in contact with the windscreen, to be suitably secured in place, preferably by means of a suitable adhesive. Alternatively, the rails 20 could be formed integrally with such a frame or jig, which could then, with the rails 20 fixed to the windscreen, form a permanent sub-frame of the accessory module assembly 12. This arrangement greatly improves the tolerances achievable, while reducing the time and therefore cost of fitting the rails 20 to the windscreen. Further time and cost savings can then be expected when it comes to fitting the frame assembly 16 to the rails 20, as the elimination of inaccuracies in spacing between the rails 20 will ensure that the frames 16 consistently and accurately fit into position about the rails 20. It will also be apparent that any other fixing elements may be employed to allow the module assembly 12 to be secured against the vehicle windscreen.

Figure 4:
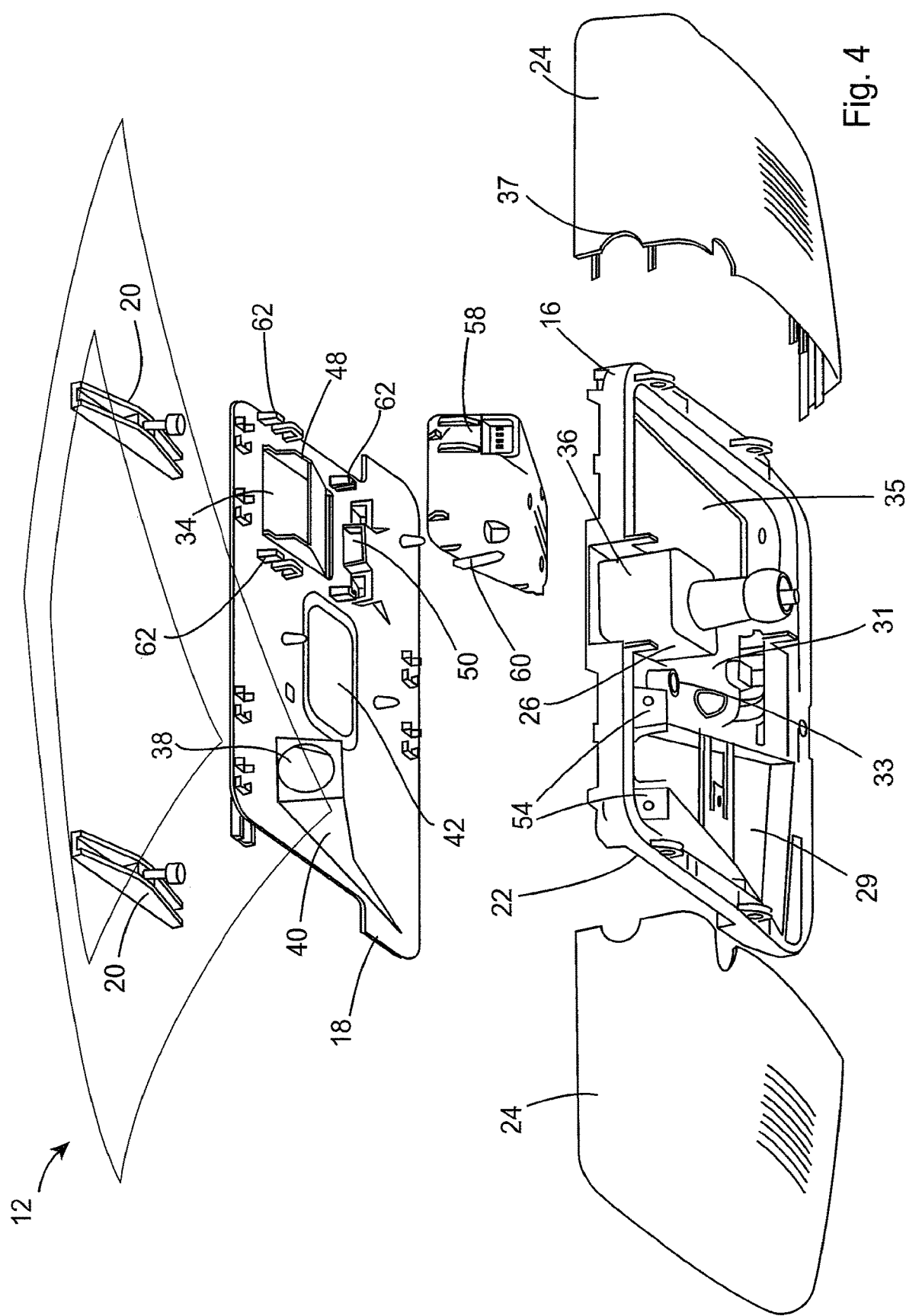
FIG. 4 illustrates a partially exploded view of the accessory module assembly, in which a cover assembly is separated therefrom, and in which the internal accessories have been omitted for clarity.

On the cabin facing side of the accessory module assembly 12, there is provided an outer casing 24 surrounding the frame assembly 16 with a support bracket 26 projecting from the frame assembly 16, through the outer casing 24, to which the mirror assembly 14 is connected, preferably by a ball and socket joint or the like. As the rails 20 are all recessed inwardly of the frame assembly 16, and with the outer casing 24 in place, the accessory module assembly 12 is given a "floating" appearance from the vehicle interior. For ease of installation, the outer casing 24 is preferably provided in two parts, as illustrated in FIG. 4, allowing the two parts to be quickly and easily installed/removed on the module assembly 12. Any suitable means may be provided to secure the two parts together, in addition to securing the outer casing 24 to the module assembly 12.

Figure 7:
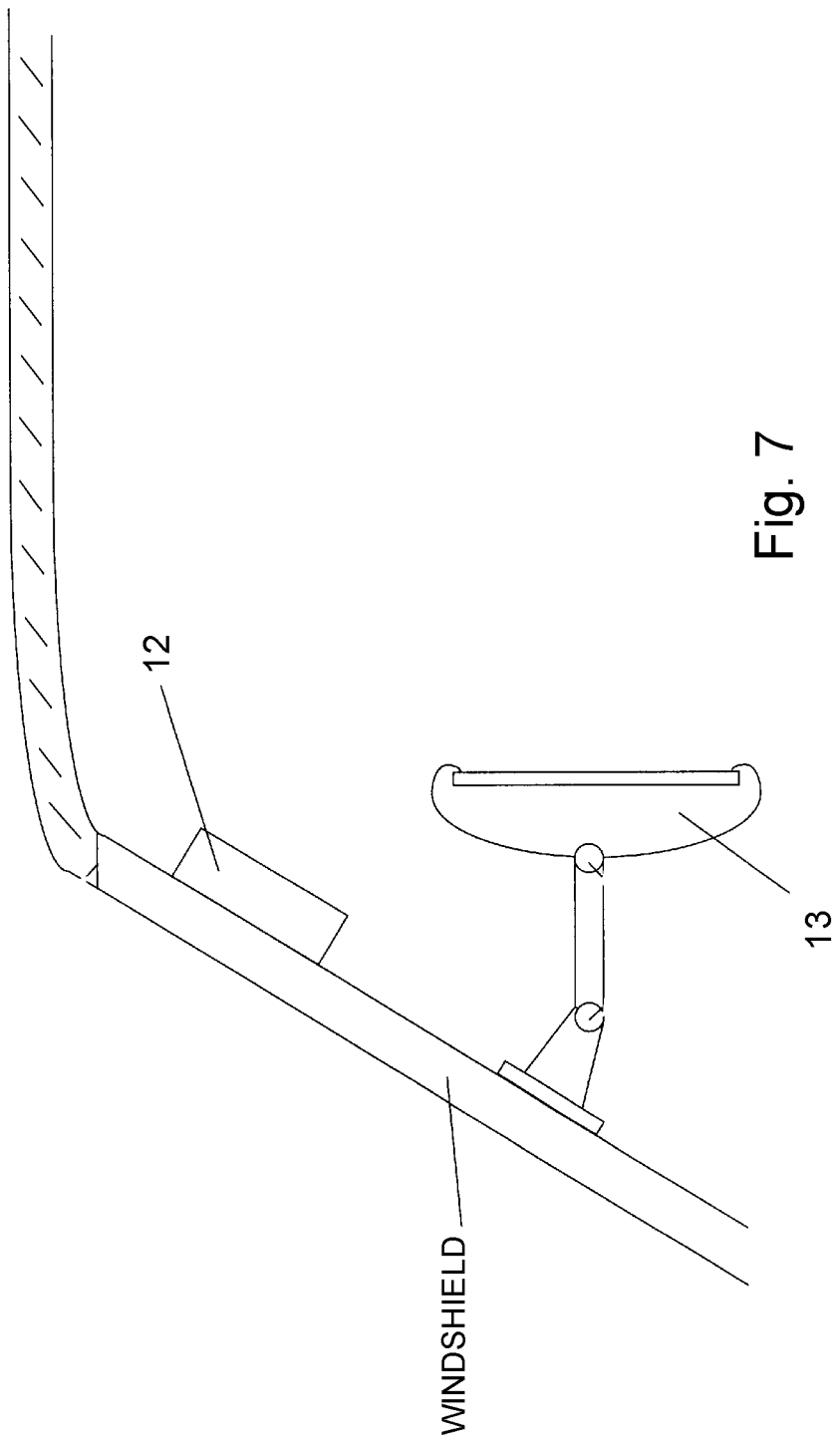
FIG. 7 is a side elevation of a mounting arrangement of an accessory module assembly at the windshield of a vehicle separate from an interior rearview mirror assembly.

Optionally, accessory module assembly 12 may be a stand-alone module assembly that is separate and distinct from the interior rearview mirror 13 of the vehicle (FIG. 7). If so, it may be desirable to include a mirror mounting button as part of accessory module assembly 12 so that an interior mirror assembly can be attached thereto in a "button-on-button" attachment manner such as is disclosed in the likes of U.S. Pat. Nos. 6,968,736; 6,824,281; and 6,690,268 (the entire disclosures of which are hereby incorporated by reference herein). In this regard, inclusion of a rain sensor (whether contacting or non-contacting such as a capacitive rain sensor being developed by Preh-Werke GmbH & Co. KG of Bad Neustadt, Germany) is contemplated.

Turning then to the interior of the accessory module assembly 12, and as mentioned above, a plurality of accessories or electronic components are housed therein, for performing various functions to and within the vehicle to improve the safety and/or comfort for the vehicle occupants. In the preferred embodiment illustrated, these accessories comprise a camera 28, a rain sensor assembly 30, a windscreen temperature sensor assembly 32, a closing velocity (CV) sensor assembly 34, and a compass 36, the configuration and operation of each of which is described in detail below. As will also be described hereinafter, the frame assembly 16 defines a site in the form of an enclosure 29 for the camera 28, a site in the form of a cradle 31 for the rain sensor assembly 30, a site in the form of a sleeve 33 for the temperature sensor assembly 32, and a site in the form of an opening 35 for the CV sensor assembly 34. Compass 36 preferably includes a compass sensor, such as a magneto-responsive sensor such as a magneto-resistive sensor, a magneto-capacitive sensor, a magneto-inductive sensor, a Hall effect sensor, or a flux gate sensor and/or a compass display, such as the types disclosed in U.S. Pat. No. 5,802,727, which is hereby incorporated herein by reference or in U.S. provisional application Ser. No. 60/636,931, filed Dec. 17, 2004, which is hereby incorporated herein by reference in its entirety.

All of the above accessories, except the compass 36, require either direct contact with the vehicle windscreen, or the ability to communicate, through the windscreen, with the exterior of the vehicle, for reasons set out hereinafter. Thus although the cover assembly 18 masks the internal workings of the accessory module assembly 12 from the exterior of the vehicle, the cover assembly 18 is nevertheless provided with a camera aperture 38 and associated channel 40, a rain sensor aperture 42, a windscreen temperature sensor aperture 44, a transmitter aperture 46 and associated channel 48, and a receiver aperture 50 and associated channel 52. These apertures in the cover assembly 18 allow the respective components to communicate with and/or through the windscreen.

Figure 5:
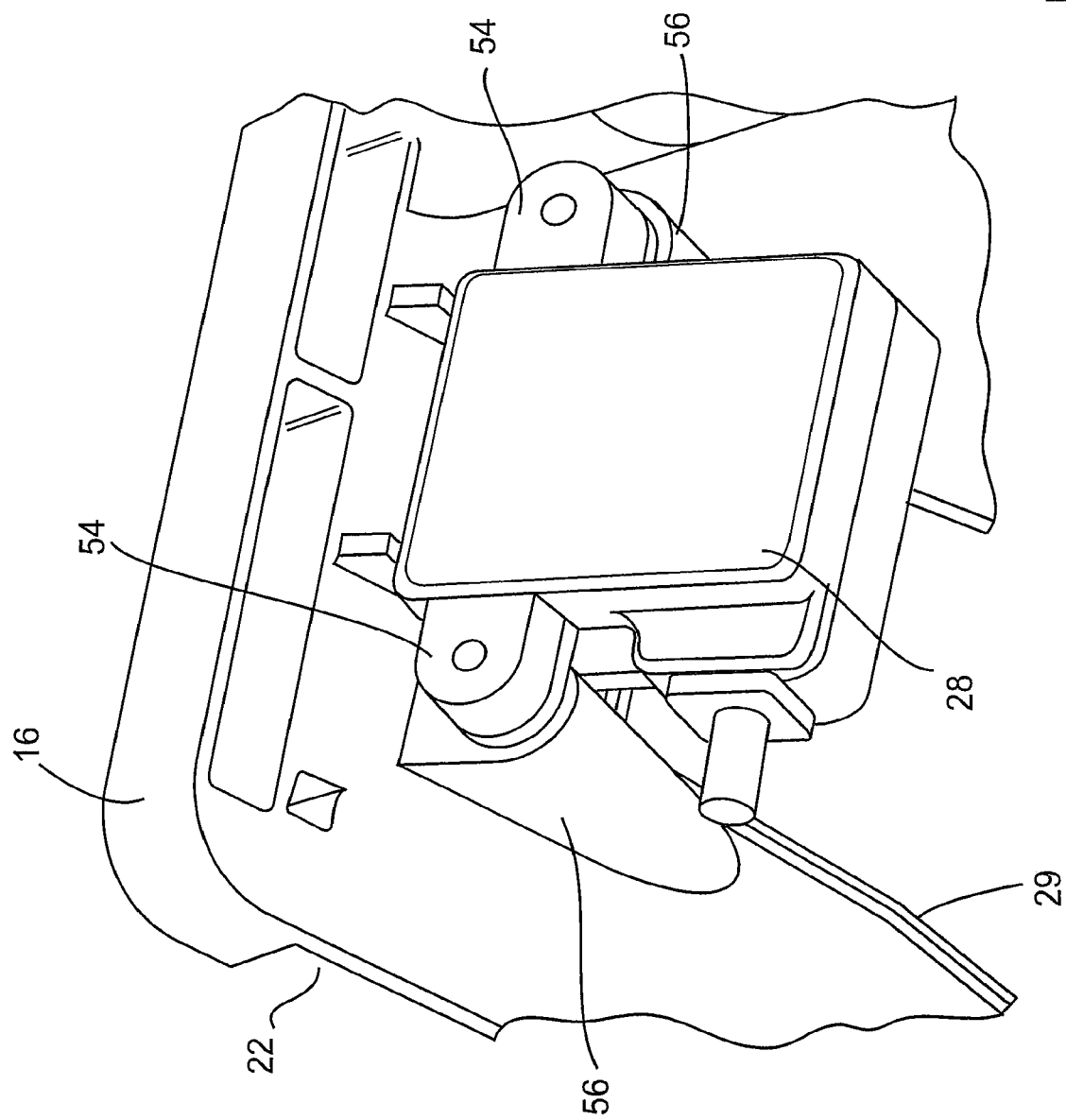
FIG. 5 illustrates a perspective view, from behind, of a camera assembly located within the accessory module assembly, showing one method of securing the cover assembly to the frame assembly.

Turning firstly to the camera 28, and referring to FIG. 5, a pair of tabs 54 are provided, one on either side of the camera 28, to facilitate connection of the camera 28 to the frame assembly 16. In the preferred embodiment illustrated, the site for the camera 28, in addition to the opening 29, comprises a pair of abutments 56 located on the frame assembly 16, to which abutments 56 the tabs 54 are secured by any suitable means, for example screws or the like. When mounted as illustrated, the line of vision of the camera 28 is directed through the camera aperture 38 in the cover assembly 18, along the corresponding channel 40, and in use out through the windscreen of the vehicle. The camera 28 may then be employed as part of a collision avoidance system for the vehicle, by focusing the camera a suitable distance beyond the bonnet of the vehicle, with feedback from the camera then being employed to generate warning signals, preferably audio and/or visual warning signals, if a collision seems imminent, or to actively intervene, for example by lightly applying the brakes of the vehicle, in an attempt to avoid any such collision. Such a collision avoidance system in isolation is known, for example as produced by Delphi Automotive Systems of Troy, Michigan, the United States.

Although in the embodiment illustrated the camera 28 is affixed to the frame assembly 16 via the tabs 54 and corresponding abutments 56, any other suitable mounting means may be employed. For example it is envisaged that connecting means (not shown) could be employed which provide the simultaneous mechanical and electrical connection of the camera 28 to the frame assembly 16. The same arrangement could be employed for the rain sensor assembly 30, window temperature sensor assembly 32 and the closing velocity sensor assembly 34. Such connecting means could for example employ magnetic elements to achieve both the mechanical and electrical connection of one or more of the accessories into the frame assembly 16. Such an arrangement is particularly advantageous where the accessory or associated connection point is in an awkward or out of sight location.

When the module assembly 12 is fitted to a vehicle, it is necessary to conduct a final alignment of the camera 28 relative to the exterior of the vehicle, in particular the front of the bonnet. This final alignment is however undertaken in a known manner using dedicated software, which does not therefore require the physical adjustment of the camera 28 within the module assembly 12. However, this final software effected alignment is capable of achieving only a small range of adjustment in the x, y and z directions. For this reason, it is desirable that the position of the camera 28 can be physically adjusted within the frame assembly 16. This adjustment is preferably achieved at the point of mounting the camera 28 to the frame assembly 16, and in the embodiment illustrated, via the tabs 54 and corresponding abutments 56, which may be suitably modified, although not illustrated, to allow the simple x, y and z axes adjustment of the camera 28 relative to the frame assembly 16. Alternatively, the adjustment may take the form of calibrating the camera 28 to the frame assembly 16 by, for example, the addition or removal of material such as shims or similar spacers (not shown) such as to achieve a combined tolerance for the camera 28 and frame assembly 16. It will of course be understood that any other suitable or equivalent arrangement could be employed to achieve this desired result. It will also be appreciated that similar provisions could be employed for any of the other accessories within the system 10.

Turning then to the rain sensor assembly 30, the frame assembly 16 is provided with the cradle 31 for receiving and retaining the rain sensor assembly 30. In order to function correctly, the rain sensor assembly 30 must be urged, in use, against the vehicle windscreen with significant force. Thus in use the rain sensor assembly 30 is pressed through the rain sensor aperture 42 in the cover assembly 18. As no adhesive or the like is to be utilized in securing the rain sensor assembly 30 to the windscreen, the force to be applied to the rain sensor assembly 30 must thus be applied by the frame assembly 16, via the cradle 31. For this reason it is preferable that the frame assembly 16, and therefore the cradle 31, is formed from a substantially rigid material, for example a metal, and in particular die-cast aluminum or an alloy thereof. The frame assembly 16 can then be mounted against the windscreen, the rigidity thereof ensuring that the frame assembly 16 is capable of applying, and maintaining, a suitable force to the rain sensor assembly 30 in order to urge same against the windscreen.

The windscreen temperature sensor assembly 32 is mounted within the sleeve 33 formed integrally with the frame assembly 16, with the free end of the windscreen temperature sensor assembly 32 projecting through the windscreen temperature sensor aperture 44 to contact and be urged against the interior surface of the vehicle windscreen. In this way, and as described in our co-pending International Patent Application No. PCT/EP2005/010071 (the entire disclosure of which is hereby incorporated by reference herein), the temperature sensor assembly 32 can be used in combination with additional sensor assemblies (not shown) to predict internal misting of the vehicle windshield, and take active steps to prevent such an occurrence, for example by activating an air conditioning system (not shown) of the vehicle. The temperature sensor assembly 32 may be spring biased within the sleeve 33, in order to ensure that an intimate thermally conductive contact is made between the temperature sensor assembly 32 and the windscreen.

The preferred closing velocity (CV) sensor assembly 34 utilizes a LIDAR (light detection and ranging) collision-avoidance detector which operates on a similar principle as radar. Basically, the CV sensor assembly 34 emits light, through the transmitter aperture 46 and associated channel 48, through the vehicle windscreen, and forwardly of the vehicle. The transmitted light will then be reflected by a leading vehicle if within a certain range, the reflected light being received by the CV sensor assembly 34, via the receiver aperture 50 and associated channel 52. The CV sensor assembly 34 can then determine the velocity and range of a leading vehicle, and again take preventative measures to avoid a collision. Again this type of system is already in existence in isolation, for example as manufactured by Continental Temick. To improve the performance/accuracy of the CV sensor assembly 34, it is desirable to substantially eliminate stray or background light being reflected onto the CV sensor 34 from the walls of the channel 52, as this may lead to false or inaccurate readings. It is therefore preferable that the walls of the channel 52 are coated or covered with a light absorbing layer or film, which may be in the form of a paint, fabric, or any other suitable coating.

In the preferred embodiment illustrated, the CV sensor assembly 34 is provided prefixed in a custom molded housing 58 which can then quickly and easily be located and secured within the opening 35 in the frame assembly 16. In order to secure the housing 58 relative to the frame assembly 16, the housing 58 is provided with a plurality of tabs 60, with the cover assembly 18 comprising a mounting member in the form of corresponding slots 62 for receiving the tabs 60. The housing 58, containing the CV sensor assembly 34, can then quickly and easily be clipped onto the underside of the cover assembly 18, ensuring accurate alignment of the CV sensor assembly 34 with the transmitting and receiving apertures 46, 50. Once the cover assembly 18 is mounted onto the frame assembly 16, the housing 58, and therefore the CV sensor assembly 34, are positioned within the dedicated opening 35 in the frame assembly 16. It will of course be appreciated that any other suitable arrangement may be employed in order to secure the housing 58 relative to the frame assembly 16. For example, the frame assembly 16 could be provided with means for receiving the tabs 60.

The compass 36, in the preferred embodiment illustrated, is provided on a printed circuit board (PCB) mounted on the support bracket 26, which thus acts as the site for the compass 36. It will of course be appreciated that the compass 36 could be located in any other suitable position within the accessory module assembly 12. The outer casing 24 is then provided with a window 37 formed therein, through which window 37 the compass 36 is visible from an interior of the vehicle. The window 37 could be enlarged to reveal a display from, or associated with, one or more additional accessories (not shown), for example an environmental control system (not shown) including, for example, a cabin temperature sensor assembly, a humidity sensor assembly, an exterior temperature sensor assembly, a petrol gauge, or any other useful display. The system 10 could also be adapted such that said enlarged display (not shown) could be provided as a separate add on module or component (not shown) which may be clipped or otherwise secured to the module assembly 12, preferably at or adjacent the site of the window 37, in order to be clearly visible to a vehicle occupant, above the mirror assembly 14.

In order to reduce the amount of wiring between a vehicle and the accessory module system 10, an electrical terminal 64 is provided within the accessory module assembly 12, and in the embodiment illustrated is adjacent the rain sensor assembly 30. The terminal 64 is connected to the vehicle via a single power and/or control cable, namely a first power/control input 66 which passes through the outer casing 24 as illustrated in FIG. 4, across the frame assembly 16, for connection with the terminal 64. Extending out of the terminal 64 is a first power/control outlet 68 which connects to the CV sensor assembly 34, a second power/control outlet 70 which connects to the rain sensor assembly 30, and a third power/control outlet 72 which extends into the mirror assembly 14, in order to power/control any electronic components contained therein. Thus in this way a plurality of the accessories contained within the accessory module system 10 may be powered/controlled from a single power/control input 66 provided to the accessory module assembly 12, thereby greatly reducing the wiring requirements between a vehicle and the accessory module system 10.

In the embodiment illustrated, the camera 28 employed utilizes complementary metal oxide semi-conductor (CMOS) circuitry and processing, and as a result requires a separate power/control supply to the remaining accessories within the accessory module system 10. Thus in the embodiment illustrated a second power/control input 74 is provided between the vehicle and the accessory module assembly 12, which again passes through the outer casing 24, and terminates in a plug 76. The camera 28 is provided with a complimentary plug 78 which connects to the plug 76 in order to provide power/control to the camera 28. Thus the accessory module system 10 requires only two wiring inputs in order to control a plurality of accessories. If the camera 28 were omitted from the accessory module system 10, only a single electrical connection would be required between the vehicle and the accessory module system 10. It will also be apparent that the terminal 64 could be modified to supply power/control to more than the three accessories provided in the preferred embodiment illustrated.

Indeed as the accessory module system 10, and in particular the accessory module assembly 12, is designed to be modular in nature, allowing the inclusion or omission of one or more of the accessories therein, without affecting the operation of the remaining accessories, the primary function of the terminal 64 is to allow a single incoming wiring configuration to be utilized with the accessory module system 10, regardless of the internal configuration of accessories contained within the accessory module assembly 12. If more or less accessories are utilized than in the preferred embodiment illustrated, the first power/control outlet 68, second outlet 70 and third outlet 72, which together form an internal wiring harness for the accessory module assembly 12, need simply be replaced with a suitably modified version of same in order to accommodate the array of accessories to be utilized.

Communication between the accessories within the accessory module assembly 12 and the vehicle systems to be controlled by same, in addition to communication between the accessories within the accessory module assembly 12 and the mirror assembly 14, may take a number of forms, for example using Bluetooth® technology, infrared (IR), or radiofrequency (RF) applications. Such wireless communication will simplify the wiring harness to be used within and to the accessory module system 10, and therefore also give greater flexibility to the system 10 in terms of the interchangeability of accessories that can be employed within the system 10. Hard wiring will still have to be employed to power the various accessories. However, the various wires could be replaced with a network of electrically conductive strips routed internally of the module assembly 12, with each branch or strip (not shown) being contacted by the respective accessory or a terminal thereof upon the location of the accessory within the frame assembly 16.

If the number of accessories contained within the accessory module assembly 12 is to be varied, it is preferable to provide a suitably modified cover assembly (not shown) to replace the cover assembly 18, which modified cover assembly can then be provided with the correct arrangement of apertures therein to correspond to the accessories being utilized. It will therefore be appreciated that the accessory module system 10 is modular in form and function.

As detailed above, due to the requirement for the rain sensor assembly 30 and the temperature sensor assembly 32 to be pressed against the windscreen with significant force, the frame assembly 16 is preferably formed from a substantially rigid material such as a metal or the like. For this reason, and as a result of manufacturing tolerances both in producing the accessory module system 10, and in producing the vehicle windscreen, the shape of the frame assembly 16 is unlikely to exactly match that of the curved windscreen of the vehicle, which may therefore result in slight gaps being present between the frame assembly 16 and the windscreen, negatively affecting the aesthetics of the accessory module system 10 when fitted. In addition, such gaps may allow the ingress of dirt/dust or the like contaminants between the windscreen and the module assembly 12, which may then obscure the vision of one or more of the accessories. For this reason, the cover assembly 18 is preferably formed from a resiliently deformable material, and is thus capable of deforming to conform substantially precisely to the shape of the windscreen, regardless of any slight deviations in dimensions due to manufacturing tolerances. Thus from the exterior of the vehicle the cover assembly 18 will provide the appearance of forming a perfect match between the accessory module assembly 12 and the vehicle windscreen, which should therefore prevent any dirt/dust from migrating between the windscreen and the module assembly 12. Although not illustrated in the preferred embodiment, it is also envisaged that the cover assembly 18 be resiliently or spring-mounted to the frame assembly 16, in order, in use, to actively urge the cover assembly 18 against the windscreen, in order to fully conform to the shape thereof.

The system 10 also preferably comprises the use of a frit (not shown) on the vehicle windscreen (not shown), at the position at which the accessory module assembly 12 is mounted. The frit should then be provided with clear areas corresponding in position and shape to the apertures and/or channels formed in the cover assembly 18.

Due to the position of the accessory module assembly 12 on the windscreen or other window of a vehicle, the accessory module assembly 12 will be subjected, in use, to significant incident radiation, in particular solar radiation, which could result in heating of the accessory module assembly 12, possibly adversely affecting the accessories contained therein. For this reason, the cover assembly 18 preferably comprises a heat deflecting material, more preferably a material having a heat deflection temperature of at least 75° C., more preferably at least 85° C., and most preferably at least 105° C.

Figure 6:
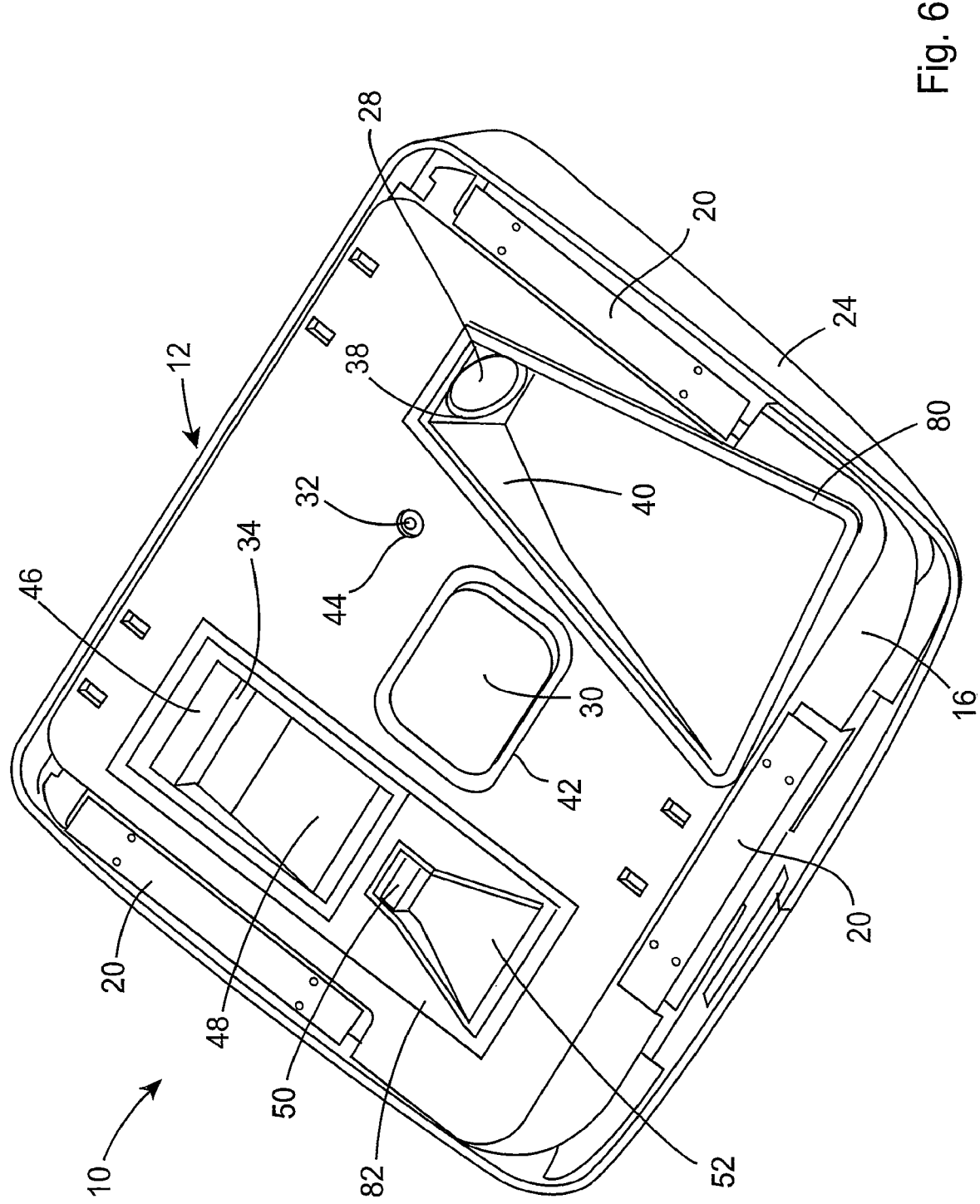
FIG. 6 illustrates a perspective view of the accessory module assembly and mirror assembly forming the accessory module system, in which a pair of gaskets are provided on the cover assembly.

In certain environmental conditions, it is possible that the area of windscreen effectively enclosed by the module assembly 12, and in particular by the various apertures in the cover assembly 18, may become misted/fogged, or otherwise obscured, thereby negatively affecting the performance of the various accessories in the system 10, which generally require a clear field of vision through the windscreen in order to perform effectively. In order to prevent such an occurrence, and referring to FIG. 6, the module assembly 12 is preferably provided with a first fluid impermeable gasket 80 surrounding the camera aperture 38 and associated channel 40, and a second fluid impermeable gasket 82 surrounding the transmitter aperture 46 and associated channel 48 and the receiver aperture 50 and associated channel 52. These gaskets 80, 82 form, in use, a seal with the windscreen to prevent the ingress of moisture and/or dirt into the spaces defined by the above mentioned channels 40, 48, 52, in order to prevent the formation/accumulation of mist/fog or dirt therein.

As a further measure, it is proposed that a respective vent or port (not shown) be provided, communicating with the otherwise sealed space or cavity defined by the gaskets 80, 82 and respective channels 40, 48, 52, said ports having a gas permeable but fluid impermeable barrier or membrane, in order to allow air into and out of the spaces, but to prevent moisture from reaching said spaces. Such a breathable membrane could be formed from Goretex® or the like.

In the absence of such a membrane, the air being channeled through the respective port could be directed over a relatively cool surface, for example the metal frame assembly 16, which would then cause a significant portion of any water vapor in the air to condense out onto the relatively cool surface, thus reducing or eliminating the occurrence of misting/fogging in said spaces. Alternatively the air may be channeled through a suitably designed baffle (not shown) which is adapted to permit the passage of heated air, but not any moisture contained therein, to reach the otherwise sealed spaces defined by the gaskets 80, 82. This ability to heat or otherwise control the environmental conditions within these spaces is particularly important when a vehicle is operating in cold climates, where frost may form on the outer surface of the vehicle windscreen. In order for the various accessories, in particular the camera 28 and CV sensor assembly 34, to have a clear view through the windscreen in order to operate correctly, the frost must first be cleared from the windscreen. This is normally achieved using heated air blown up and along the interior surface of the windscreen form the vehicles air conditioning system, which heats the windscreen through to the outer surface, thereby dispersing or melting the frost. However as a result of the gaskets 80, 82, this heated air cannot reach the areas of the windscreen through which the camera 28 and CV sensor assembly 34 look, and these areas must therefore be heated from within the module assembly 12 as described above.

It will of course be appreciated that any other measure may be taken to reduce or eliminate misting, fogging or frost on that portion of the windscreen against which the module assembly 12 is seated.

The accessory module assembly 12 can house a large array of sensor assemblies and other components, other than those describe in detail above, for example a cabin temperature sensor assembly, a cabin humidity sensor assembly, an ambient light and a glare sensor assembly for an electrochromic (EC) mirror cell, a phone system, petrol gauge display, and any other desired components or accessories. Many of these accessories were previously housed with a vehicles rearview mirror, and thus the provision of the accessory module assembly 12 can generate a relatively large amount of free space within the vehicles rearview mirror assembly. As a result, the mirror assembly 14 could be significantly reduced in size, in particular in depth or thickness, and especially where an EC cell is employed, thereby providing an aesthetically pleasing appearance. Alternatively or simultaneously, this additional space may be used to apply one or more digital displays to the rear of the EC cell, which can then display information, through the EC cell, to a driver or passenger of the vehicle.

It will thus be appreciated that the accessory module system 10 of the present invention provides a convenient location in which to house a large array of accessories and/or sensors or the like, and which is modular in terms of the combination of said accessories which may be housed within same.

The accessory module or system 10 of the present invention may utilize aspects of other accessory modules or windshield electronics modules or the like, such as modules of the types described in U.S. patent application Ser. No. 10/958,087, filed Oct. 4, 2004, now U.S. Pat. No. 7,188,963; Ser. No. 10/456,599, filed Jun. 6, 2003, now U.S. Pat. No. 7,004,593; and/or Ser. No. 11/201,661, filed Aug. 11, 2005, now U.S. Pat. No. 7,480,149, and/or U.S. Pat. Nos. 6,824,281; 6,690,268; 6,250,148; 6,341,523; 6,593,565; 6,428,172; 6,501,387; 6,329,925; and 6,326,613, and/or in PCT Application No. PCT/US03/40611, filed Dec. 19, 2003 and published Jul. 15, 2004 as International Publication No. WO 2004/058540, and/or Ireland patent applications Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference.

The interior rearview mirror assembly 14 of the accessory module system 10 may include an electro-optic reflective element or a prismatic reflective element. For example, the reflective element may comprise an electro-optic or electrochromic reflective element assembly or cell, and the electrochromic reflective element assembly of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 5,142,406; 5,442,478; and/or 4,712,879, which are hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein; and/or as described in U.S. patent application Ser. No. 10/054,633, filed Jan. 22, 2002, now U.S. Pat. No. 7,195,381, which is hereby incorporated herein by reference. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly.

The mirror assembly 14 may include one or more other displays, such as the types disclosed in U.S. Pat. Nos. 5,530,240 and/or 6,329,925, which are hereby incorporated herein by reference, and/or display-on-demand transflective type displays, such as the types disclosed in U.S. Pat. Nos. 6,690,268; 5,668,663 and/or 5,724,187, and/or in U.S. patent applications Ser. No. 10/054,633, filed Jan. 22, 2002, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. 2006/0050018; Ser. No. 11/021,065, filed Dec. 23, 2004, now U.S. Pat. No. 7,255,451; and/or Ser. No. 11/226,628, filed Sep. 14, 2005 and published Mar. 23, 2006 as U.S. Publication No. 2006/0061008; PCT Application No. PCT/US03/29776, filed Sep. 9, 2003 and published Apr. 1, 2004 as International Publication No. WO 2004/026633; PCT Application No. PCT/US03/35381, filed Nov. 5, 2003 and published May 21, 2004 as International Publication No. WO 2004/042457; and/or PCT Application No. PCT/US03/40611, filed Dec. 19, 2003 and published Jul. 15, 2004 as International Publication No. WO 2004/058540, which are all hereby incorporated herein by reference.

Optionally, the mirror assembly 14 may comprise a prismatic mirror assembly, such as a prismatic mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 and published on Dec. 2, 2004, as International Publication No. WO 2004/103772; and U.S. patent application Ser. No. 10/933,842, filed Sep. 3, 2004, now U.S. Pat. No. 7,249,860, which are hereby incorporated herein by reference. Optionally, the prismatic reflective element may comprise a conventional prismatic reflective element or prism, or may comprise a prismatic reflective element of the types described in PCT Application No. PCT/US03/29776, filed Sep. 19, 2003 and published on Apr. 1, 2004, as International Publication No. WO 2004/026633; U.S. patent applications Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255, 451; Ser. No. 10/528,269, filed Mar. 17, 2005, now U.S. Pat. No. 7,274,501; and/or Ser. No. 10/993,302, filed Nov. 19, 2004, now U.S. Pat. No. 7,338,177, and/or PCT Application No. PCT/US2004/015424, filed May 18, 2004 and published on Dec. 2, 2004, as International Publication No. WO 2004/103772, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention. Optionally, the mirror assembly 14 may comprise an electro-optic or electrochromic reflective element assembly, as discussed below.

Optionally, the accessory module 12 and/or mirror assembly 14 and/or accessory module system 10 may include one or more displays, such as for the accessories or circuitry described herein. The displays may be similar to those described above, or may be of types disclosed in U.S. Pat. Nos. 5,530,240 and/or 6,329,925, which are hereby incorporated herein by reference, or may be display-on-demand or transflective type displays or other displays, such as the types disclosed in U.S. Pat. Nos. 6,690,268; 5,668,663 and/or 5,724,187, and/or in U.S. patent applications Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 11/226,628, filed Sep. 14, 2005 and published Mar. 23, 2006 as U.S. Publication No. 2006/0061008; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Application No. PCT/US03/29776, filed Sep. 9, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/042457; and/or U.S. provisional applications Ser. No. 60/630,061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; Ser. No. 60/563,342, filed Apr. 19, 2004; Ser. No. 60/681,250, filed May 16, 2005; Ser. No. 60/690,400, filed Jun. 14, 2005; Ser. No. 60/695,149, filed Jun. 29, 2005; and/or Ser. No. 60/717,093, filed Sep. 14, 2005 by Lynam; Ser. No. 60/730,334, filed Oct. 26, 2005; and/or Ser. No. 60/732,245, filed Nov. 1, 2005, and/or PCT Application No. PCT/US03/40611, filed Dec. 19, 2003 and published Jul. 15, 2004 as International Publication No. WO 2004/058540, which are all hereby incorporated herein by reference, or may include or incorporate video displays or the like, such as the types described in PCT Application No. PCT/US03/40611, filed Dec. 19, 2003 and published Jul. 15, 2004 as International Publication No. WO 2004/058540, U.S. patent application Ser. No. 11/284,543, filed Nov. 22, 2005, now U.S. Pat. No. 7,370,983, and/or U.S. provisional applications Ser. No. 60/630,061, filed Nov. 22, 2004; and Ser. No. 60/667,048, filed Mar. 31, 2005, which are hereby incorporated herein by reference.

Optionally, the display and inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,690,268; 6,672,744; 6,386,742; and 6,124,886, and/or U.S. patent applications Ser. No. 10/739,766, filed Dec. 18, 2003, now U.S. Pat. No. 6,877,888; and/or Ser. No. 10/355,454, filed Jan. 31, 2003, now U.S. Pat. No. 6,824,281, and/or PCT Application No. PCT/US03/03012, filed Jan. 31, 2003 and published on Aug. 7, 2003 as International Publication No. WO 03/065084, and/or PCT Application No. PCT/US03/40611, filed Dec. 19, 2003 and published on Jul. 15, 2004 as International Publication No. WO 2004/058540, and/or PCT Application No. PCT/US04/15424, filed May 18, 2004 and published on Dec. 2, 2004, as International Publication No. WO 2004/103772, which are hereby incorporated herein by reference.

Optionally, the accessory module 12 and/or mirror assembly 14 may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; and/or 5,669,698, and/or U.S. patent applications Ser. No. 10/054,633, filed Jan. 22, 2002, now U.S. Pat. No. 7,195,381; and/or Ser. No. 10/933,842, filed Sep. 3, 2004, now U.S. Pat. No. 7,249,860, which are hereby incorporated herein by reference, may be included in the mirror assembly. The illumination sources and/or the circuit board may be connected to one or more buttons or inputs for activating and deactivating the illumination sources. Optionally, the accessory module 12 and/or mirror assembly 14 may also or otherwise include other accessories, such as microphones, such as analog microphones or digital microphones or the like, such as microphones of the types disclosed in U.S. Pat. Nos. 6,243,003; 6,278,377; and/or 6,420,975, and/or in PCT Application No. PCT/US03/308877, filed Oct. 1, 2003 and published Apr. 15, 2004 as International Publication No. WO 2004/032568. Optionally, the accessory module and/or mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. patent applications Ser. No. 10/427,051, filed Apr. 30, 2003, now U.S. Pat. No. 7,038,577; and Ser. No. 10/209,173, filed Jul. 31, 2002, now U.S. Pat. No. 6,882,287; and/or U.S. provisional application Ser. No. 60/638,687, filed Dec. 23, 2004, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. provisional applications Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. patent applications Ser. No. 11/105,757, filed Apr. 14, 2005, now U.S. Pat. No. 7,526,103; and/or Ser. No. 11/239,980, filed Sep. 30, 2005, now U.S. Pat. No. 7,881,496, a slide out or extendable/retractable video device or module, such as described in U.S. patent application Ser. No. 11/284,543, filed Nov. 22, 2005, now U.S. Pat. No. 7,370,983, U.S. provisional applications Ser. No. 60/630,061, filed Nov. 22, 2004; and/or Ser. No. 60/667,048, filed Mar. 31, 2005; and/or PCT Application No. PCT/US03/40611, filed Dec. 19, 2003 and published Jul. 15, 2004 as International Publication No. WO 2004/058540, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731, 205; and/or U.S. patent application Ser. No. 11/232,324, filed Sep. 21, 2005, now U.S. Pat. No. 7,423,522; and/or U.S. provisional application Ser. No. 60/611,796, filed Sep. 21, 2004), and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the accessory module 12 and/or mirror assembly 14 may accommodate other accessories or circuitry or the like as well, such as a rain sensor or imaging device or the like. For example, the accessory module and/or mirror assembly may include a mounting portion (such as the types described in U.S. patent application Ser. No. 11/226,628, filed Sep. 14, 2005 and published Mar. 23, 2006 as U.S. Publication No. 2006/0061008; and/or U.S. provisional applications Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624, 091, filed Nov. 1, 2004, and Ser. No. 60/609,642, filed Sep. 14, 2004, which are all hereby incorporated herein by reference), and may include a rain sensor or the like and may position the rain sensor against the windshield, such as described in U.S. Pat. Nos. 6,250,148; 6,341,523; 6,516, 664; 6,968,736; and 6,824,281, and in U.S. patent application Ser. No. 10/958,087, filed Oct. 4, 2004, now U.S. Pat. No. 7,188,963, which are all hereby incorporated herein by reference. Optionally, the accessory module 12 and/or mirror assembly 14 may include an imaging device, such as an imaging array sensor for imaging systems of the types described in U.S. Pat. Nos. 6,757,109; 6,717,610; 6,396, 397; 6,201,642; 6,353,392; 6,313,454; 6,396,397; 5,550, 677; 5,670,935; 5,796,094; 5,877,897; 6,097,023; and 6,498,620, and U.S. patent applications Ser. No. 09/441,341, filed Nov. 16, 1999, now U.S. Pat. No. 7,339,149, and Ser. No. 10/427,051, filed Apr. 30, 2003, now U.S. Pat. No. 7,038,577, which are all hereby incorporated herein by reference.

Optionally, the accessory module 12 and/or mirror assembly 14 may include one or more user inputs for controlling or activating/deactivating one or more electrical accessories or devices of or associated with the mirror assembly. The accessory module 12 and/or mirror assembly 14 may comprise any type of switches or buttons, such as touch or proximity sensing switches, such as touch or proximity switches of the types described in PCT Application No. PCT/US03/40611, filed Dec. 19, 2003 and published Jul. 15, 2004 as International Publication No. WO 2004/058540; and/or U.S. Pat. Nos. 6,001,486; 6,310,611; 6,320,282; and 6,627,918; and/or U.S. patent application Ser. No. 11/021, 065, filed Dec. 23, 2004, now U.S. Pat. No. 7,255,451; and/or U.S. patent applications Ser. No. 09/817,874, filed Mar. 26, 2001, now U.S. Pat. No. 7,224,324; Ser. No. 10/956,749, filed Oct. 1, 2004, now U.S. Pat. No. 7,446,924; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 11/140,396, filed May 27, 2005, now U.S. Pat. No. 7,360,932; and/or U.S. provisional application Ser. No. 60/563,342, filed Apr. 19, 2004, which are hereby incorporated herein by reference, or the inputs may comprise other types of buttons or switches, such as those described in U.S. patent application Ser. No. 11/029,695, filed Jan. 5, 2005, now U.S. Pat. No. 7,253,723; and/or U.S. provisional applications Ser. No. 60/553,517, filed Mar. 16, 2004; Ser. No. 60/535,559, filed Jan. 9, 2004; Ser. No. 60/690,401, filed Jun. 14, 2005; and Ser. No. 60/719,482, filed Sep. 22, 2005, which are hereby incorporated herein by reference, or such as fabric-made position detectors, such as those described in U.S. Pat. Nos. 6,504, 531; 6,501,465; 6,492,980; 6,452,479; 6,437,258; and 6,369,804, which are hereby incorporated herein by reference. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; and 5,798,688, and/or U.S. patent application Ser. No. 10/770,736, filed Feb. 3, 2004, now U.S. Pat. No. 7,023,322; and/or U.S. provisional applications Ser. No. 60/502,806, filed Sep. 12, 2003; and Ser. No. 60/444,726, filed Feb. 4, 2003, which are hereby incorporated herein by reference. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; 6,420,975; 6,946,978; and 6,477,464; and/or 6,678,614; and/or U.S. patent applications Ser. No. 10/456,599, filed Jun. 6, 2003, now U.S. Pat. No. 7,004,593; Ser. No. 10/645,762, filed Aug. 20, 2003, now U.S. Pat. No. 7,167,796; and Ser. No. 10/964,512, filed Oct. 13, 2004, now U.S. Pat. No. 7,308,341; and/or PCT Application No. PCT/US03/40611, filed Dec. 19, 2003 and published Jul. 15, 2004 as International Publication No. WO 2004/058540, and/or PCT Application No. PCT/US03/308877, filed Oct. 1, 2003 and published May 21, 2004 as International Publication No. WO 2004/042457, which are all hereby incorporated herein by reference.

The invention claimed is:

1. A method for mounting an accessory at a vehicular windshield, said method comprising:

providing at least three individual fixing elements;
wherein each of the fixing elements comprises a base portion and an elongated portion that extends from the base portion;
wherein the base portion of each of the fixing elements has an attaching surface area that is larger than the cross sectional area of the elongated portion that extends from the base portion;
adhesively attaching the base portion of each of the at least three fixing elements at an interior cabin side of a vehicular windshield;
wherein, with the base portions of the fixing elements adhesively attached at the interior cabin side of the vehicular windshield, the fixing elements are spaced apart from one another at the interior cabin side of the vehicular windshield in a non-contiguous manner;
wherein, with the base portions of the fixing elements adhesively attached at the interior cabin side of the vehicular windshield, the elongated portions extend from the respective base portions in a direction away from the vehicular windshield;
providing a frame comprising a plurality of individual receiving portions, wherein the receiving portions are spaced apart from one another in a manner that corresponds with the spacing apart of the elongated portions of the fixing elements when the base portions of the fixing elements are adhesively attached at the interior cabin side of the vehicular windshield;
installing the vehicular windshield in a vehicle;
with the vehicular windshield installed in the vehicle, attaching the frame at the fixing elements via receiving the elongated portion of a respective and corresponding one of the fixing elements in a respective and corresponding one of the receiving portions of the frame;
wherein the elongated portions of said fixing elements, when received in the respective and corresponding ones of the receiving portions of the frame, cooperate with the receiving portions to attach the frame at the vehicular windshield via the fixing elements with the base portions of the fixing elements adhesively attached at the interior cabin side of the vehicular windshield;
providing a camera;
with the vehicular windshield installed in the vehicle, and with the frame attached at the fixing elements, disposing the camera at the frame so that the camera is received at structure of the frame;
wherein, with the camera received at the structure of the frame, the camera views through the vehicular windshield via an aperture existing in the frame;
wherein the aperture in the frame, with the frame attached at the fixing elements adhesively attached at the interior cabin side of the vehicular windshield, corresponds with a light transmissive aperture of a light absorbing layer of the vehicular windshield; and
wherein, with the frame attached at the fixing elements adhesively attached at the interior cabin side of the vehicular windshield, the camera views through the vehicular windshield via both the aperture in the frame and the light transmissive aperture in the light absorbing layer.

2. The method of claim 1, wherein the light transmissive aperture in the light absorbing layer corresponds in position and shape to the aperture in the frame with the frame attached at the vehicular windshield via the fixing elements adhesively attached at the interior cabin side of the vehicular windshield.

3. The method of claim 2, wherein, with the elongated portions of the fixing elements received in respective and corresponding ones of the receiving portions of the frame and cooperating with the receiving portions to attach said frame at the vehicular windshield with the base portions of the fixing elements adhesively attached at the interior cabin side of the vehicular windshield, and with the camera received at the structure of the frame, the camera has a desired forward field of view through the aperture in the frame and through the vehicular windshield.

4. The method of claim 3, wherein disposing the camera at the frame comprises disposing the camera at the frame such that the structure of the frame receives structure of the camera.

5. The method of claim 4, wherein the structure of the frame comprises at least one abutment, and wherein the structure of the camera comprises at least one tab.

6. The method of claim 1, wherein the camera comprises a complementary metal oxide semiconductor (CMOS) imager.

7. The method of claim 1, comprising providing a casing and, with the vehicular windshield installed in the vehicle and with the frame attached at the fixing elements, attaching the casing at the frame.

8. The method of claim 7, wherein the casing, when attached at the frame, at least partially surrounds the frame and the camera.

9. The method of claim 8, comprising passing wiring through the casing, wherein the wiring, with the vehicular windshield installed in the vehicle, and with the frame attached at the vehicular windshield via the fixing elements adhesively attached at the interior cabin side of the vehicular windshield, carries at least one of power and a control input.

10. The method of claim 8, wherein the casing is provided in two parts.

11. The method of claim 10, comprising, with the frame attached at the vehicular windshield via the fixing elements adhesively attached at the interior cabin side of the vehicular windshield, joining the parts of the casing together to attach the casing at the frame, wherein, with the frame attached at the vehicular windshield via the fixing elements, the joined-together parts of the casing can be separated to detach the casing from the frame.

12. The method of claim 11, wherein joining and separation of the two parts of the casing comprises moving one of the two parts of the casing relative to the other of the two parts of the casing in a direction generally lateral to a longitudinal axis of a vehicle equipped with the vehicular windshield.

13. The method of claim 8, comprising providing ventilation means at the casing.

14. The method of claim 1, comprising providing a cover and, with the vehicular windshield installed in the vehicle and with the frame attached at the fixing elements, attaching the cover at the frame, wherein, with the cover attached at the frame and the frame attached at the vehicular windshield via the fixing elements adhesively attached at the interior cabin side of the vehicular windshield, the cover is disposed between the frame and the vehicular windshield.

15. The method of claim 1, wherein the structure for receiving the camera comprises a cradle.

16. The method of claim 1, wherein the frame is separate from an interior rearview mirror assembly mounting location at the vehicular windshield.

17. A method for mounting an accessory at a vehicular windshield, said method comprising:
providing at least three individual fixing elements;

wherein each of the fixing elements comprises a base portion and an elongated portion that extends from the base portion;

wherein the base portion of each of the fixing elements has an attaching surface area that is larger than the cross sectional area of the elongated portion that extends from the base portion;

adhesively attaching the base portion of each of the at least three fixing elements at an interior cabin side of a vehicular windshield;

wherein, with the base portions of the fixing elements adhesively attached at the interior cabin side of the vehicular windshield, the fixing elements are spaced apart from one another at the interior cabin side of the vehicular windshield in a non-contiguous manner;

wherein, with the base portions of the fixing elements adhesively attached at the interior cabin side of the vehicular windshield, the elongated portions extend from the respective base portions in a direction away from the vehicular windshield;

providing a frame comprising a plurality of individual receiving portions, wherein the receiving portions are spaced apart from one another in a manner that corresponds with the spacing apart of the elongated portions of the fixing elements when the base portions of the fixing elements are adhesively attached at the interior cabin side of the vehicular windshield;

installing the vehicular windshield in a vehicle;

with the vehicular windshield installed in the vehicle, attaching the frame at the fixing elements via receiving the elongated portion of a respective and corresponding one of the fixing elements in a respective and corresponding one of the receiving portions of the frame;

wherein the elongated portions of said fixing elements, when received in the respective and corresponding ones of the receiving portions of the frame, cooperate with the receiving portions to attach the frame at the vehicular windshield via the fixing elements with the base portions of the fixing elements adhesively attached at the interior cabin side of the vehicular windshield;

providing a camera;

with the vehicular windshield installed in the vehicle, and with the frame attached at the fixing elements, disposing the camera at the frame so that structure of the camera is received at structure of the frame;

wherein, with the camera received at the structure of the frame, the camera views through the vehicular windshield via an aperture existing in the frame;

wherein the aperture in the frame, with the frame attached at the fixing elements adhesively attached at the interior cabin side of the vehicular windshield, corresponds with a light transmissive aperture of a light absorbing layer of the vehicular windshield;

wherein, with the frame attached at the fixing elements adhesively attached at the interior cabin side of the vehicular windshield, the camera views through the vehicular windshield via both the aperture in the frame and the light transmissive aperture in the light absorbing layer; and wherein the light transmissive aperture in the light absorbing layer corresponds in position and shape to the aperture in the frame with the frame attached at the vehicular windshield via the fixing elements adhesively attached at the interior cabin side of the vehicular windshield.

18. The method of claim 17, wherein the structure of the frame comprises at least one abutment, and wherein the structure of the camera comprises at least one tab.

19. A method for mounting an accessory at a vehicular windshield, said method comprising:

providing at least three individual fixing elements;

wherein each of the fixing elements comprises a base portion and an elongated portion that extends from the base portion;

wherein the base portion of each of the fixing elements has an attaching surface area that is larger than the cross sectional area of the elongated portion that extends from the base portion;

adhesively attaching the base portion of each of the at least three fixing elements at an interior cabin side of a vehicular windshield;

wherein, with the base portions of the fixing elements adhesively attached at the interior cabin side of the vehicular windshield, the fixing elements are spaced apart from one another at the interior cabin side of the vehicular windshield in a non-contiguous manner;

wherein, with the base portions of the fixing elements adhesively attached at the interior cabin side of the vehicular windshield, the elongated portions extend from the respective base portions in a direction away from the vehicular windshield;

providing a frame comprising a plurality of individual receiving portions, wherein the receiving portions are spaced apart from one another in a manner that corresponds with the spacing apart of the elongated portions of the fixing elements when the base portions of the fixing elements are adhesively attached at the interior cabin side of the vehicular windshield;

installing the vehicular windshield in a vehicle;

with the vehicular windshield installed in the vehicle, attaching the frame at the fixing elements via receiving the elongated portion of a respective and corresponding one of the fixing elements in a respective and corresponding one of the receiving portions of the frame;

wherein the elongated portions of said fixing elements, when received in the respective and corresponding ones of the receiving portions of the frame, cooperate with the receiving portions to attach the frame at the vehicular windshield via the fixing elements with the base portions of the fixing elements adhesively attached at the interior cabin side of the vehicular windshield;

providing a camera;

with the vehicular windshield installed in the vehicle, and with the frame attached at the fixing elements, disposing the camera at the frame so that the camera is received at structure of the frame;

providing a casing and, with the vehicular windshield installed in the vehicle and with the frame attached at the fixing elements, attaching the casing at the frame, wherein the casing, when attached at the frame, at least partially surrounds the frame and the camera;

wherein, with the camera received at the structure of the frame, the camera views through the vehicular windshield via an aperture existing in the frame;

wherein the aperture in the frame, with the frame attached at the fixing elements adhesively attached at the interior cabin side of the vehicular windshield, corresponds with a light transmissive aperture of a light absorbing layer of the vehicular windshield;

wherein, with the frame attached at the fixing elements adhesively attached at the interior cabin side of the vehicular windshield, the camera views through the vehicular windshield via both the aperture in the frame and the light transmissive aperture in the light absorbing layer; and wherein the light transmissive aperture in the light absorbing layer corresponds in position and shape to the aperture in the frame with the frame attached at the vehicular windshield via the fixing elements adhesively attached at the interior cabin side of the vehicular windshield.

20. The method of claim 19, comprising, with the vehicular windshield installed in the vehicle and with the frame attached at the fixing elements, passing wiring through the casing, wherein the wiring, with the vehicular windshield installed in the vehicle and with the frame attached at the vehicular windshield via the fixing elements adhesively attached at the interior cabin side of the vehicular windshield, carries at least one of power and a control input.

* * * * *

UNITED STATES PATENT AND TRADEMARK OFFICE
CERTIFICATE OF CORRECTION

| | |
|---|---|
| PATENT NO. | : 10,710,514 B2 |
| APPLICATION NO. | : 16/059544 |
| DATED | : July 14, 2020 |
| INVENTOR(S) | : Patrick J. Lawlor et al. |

Page 1 of 1

It is certified that error appears in the above-identified patent and that said Letters Patent is hereby corrected as shown below:

In the Specification

<u>Column 1</u>
Line 9, "U.S. patent Ser. No. 10,046,714" should be --U.S. Pat. No. 10,046,714--

Signed and Sealed this
Eighteenth Day of August, 2020

Andrei Iancu
*Director of the United States Patent and Trademark Office*